INVENTOR
Hans O. Schjolin
BY
T. L. Chisholm
ATTORNEY

March 24, 1959  H. O. SCHJOLIN  2,878,691
TRANSMISSION AND CONTROL SYSTEM
Filed May 3, 1954  15 Sheets-Sheet 2

INVENTOR
Hans O. Schjolin
BY
T. L. Chisholm
ATTORNEY

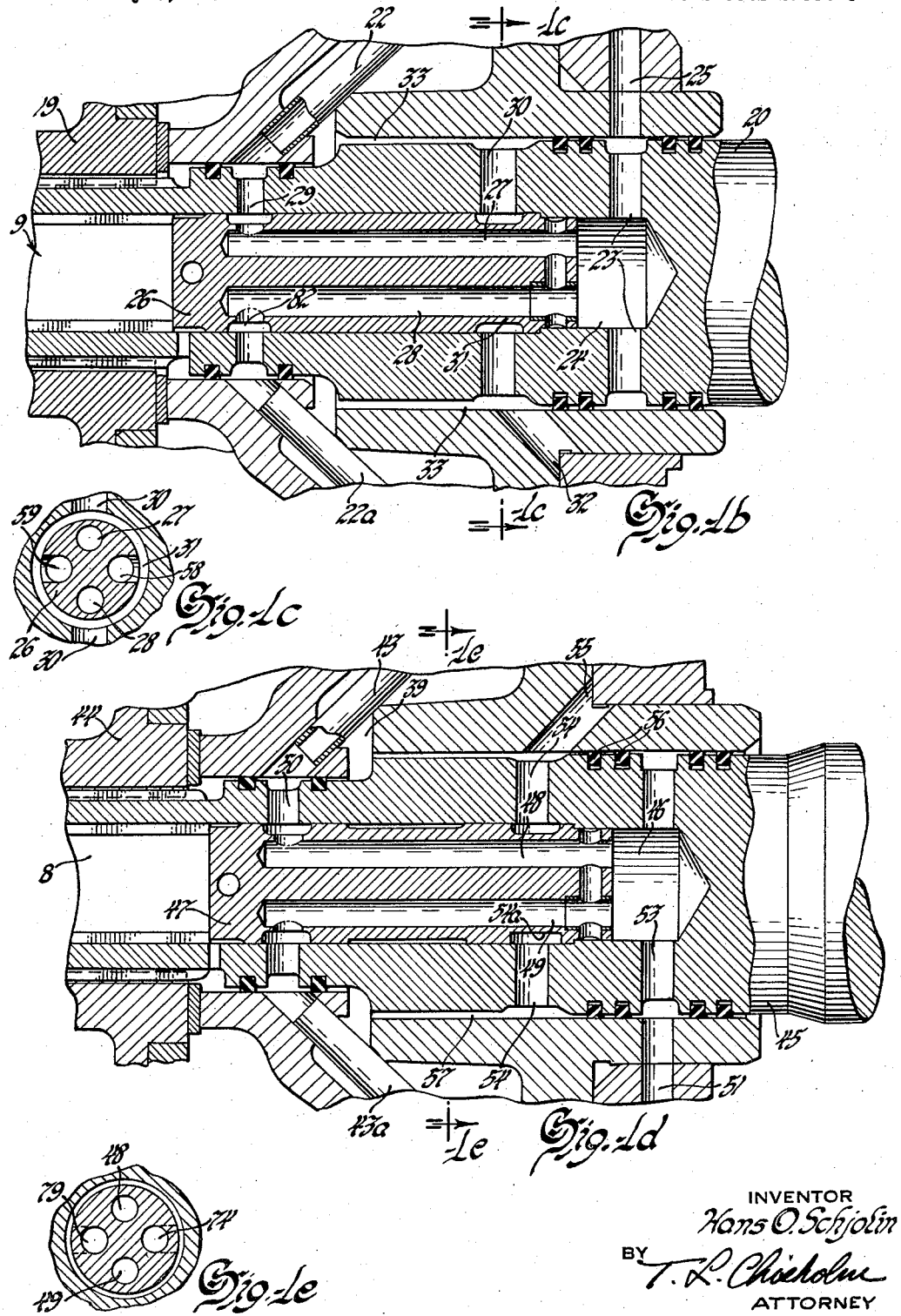

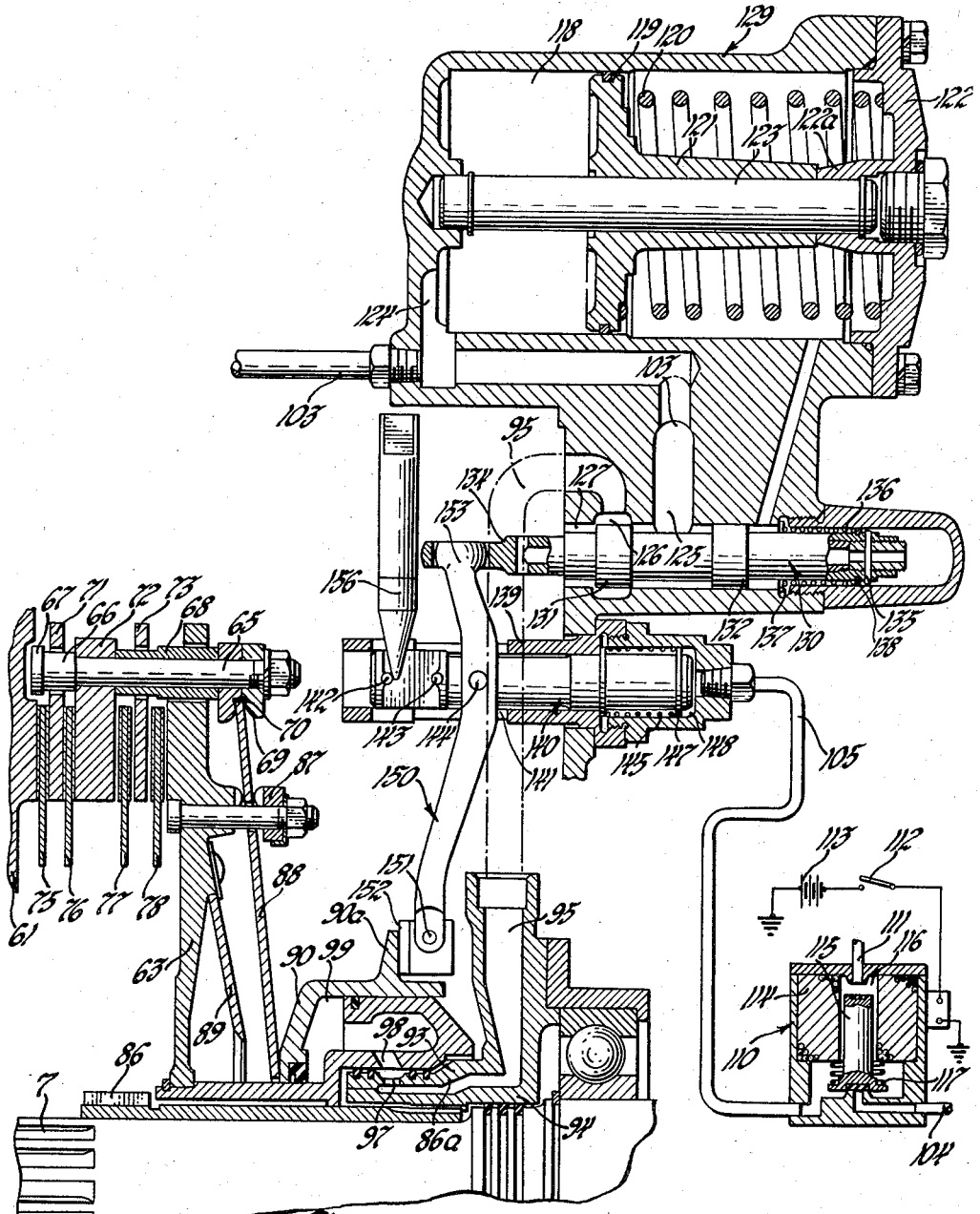

March 24, 1959  H. O. SCHJOLIN  2,878,691
TRANSMISSION AND CONTROL SYSTEM
Filed May 3, 1954  15 Sheets-Sheet 5
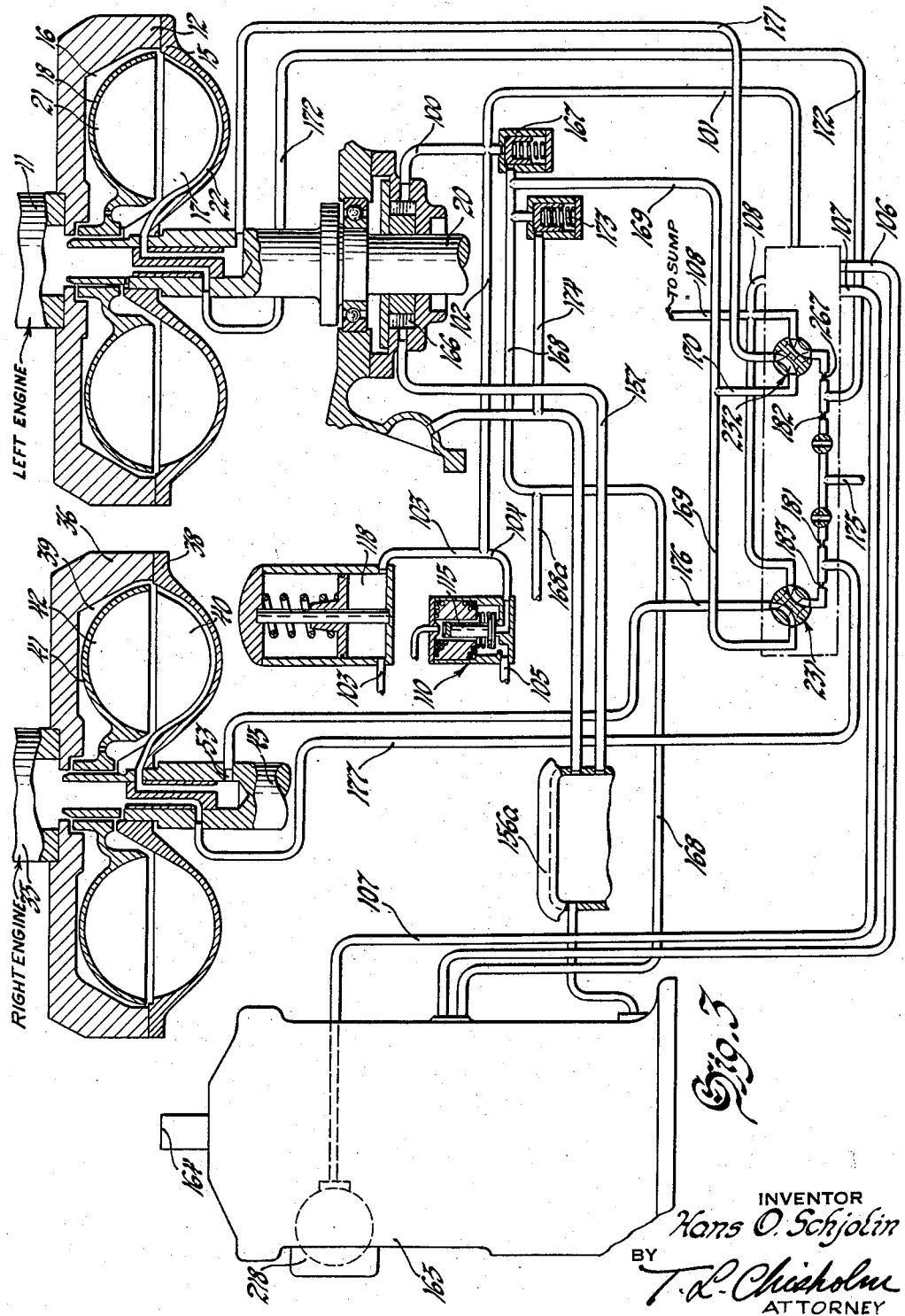
INVENTOR
Hans O. Schjolin
BY
T. L. Chisholm
ATTORNEY March 24, 1959   H. O. SCHJOLIN   2,878,691
TRANSMISSION AND CONTROL SYSTEM
Filed May 3, 1954   15 Sheets-Sheet 6
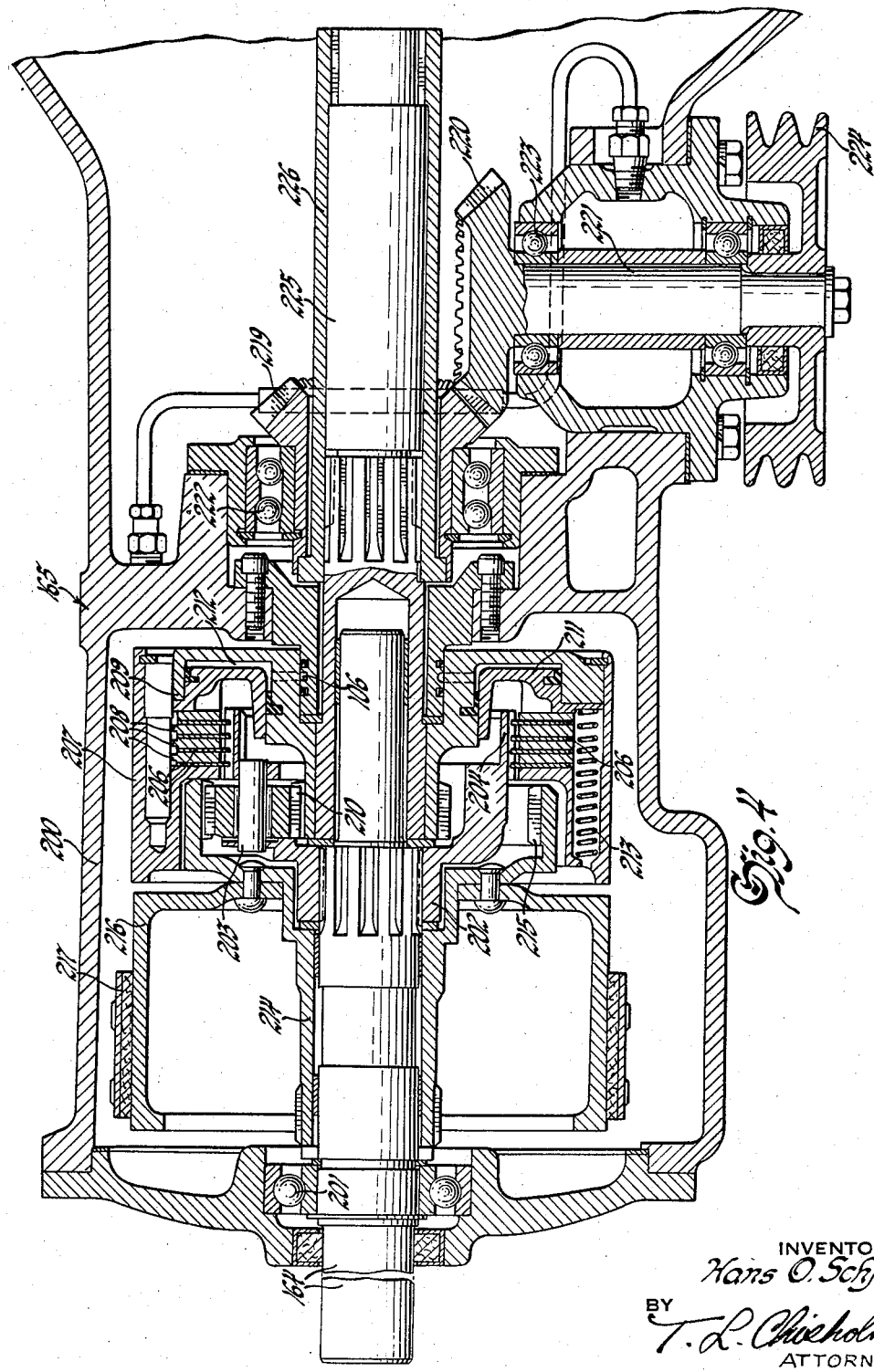
INVENTOR
Hans O. Schjolin
BY
T. L. Chisholm
ATTORNEY

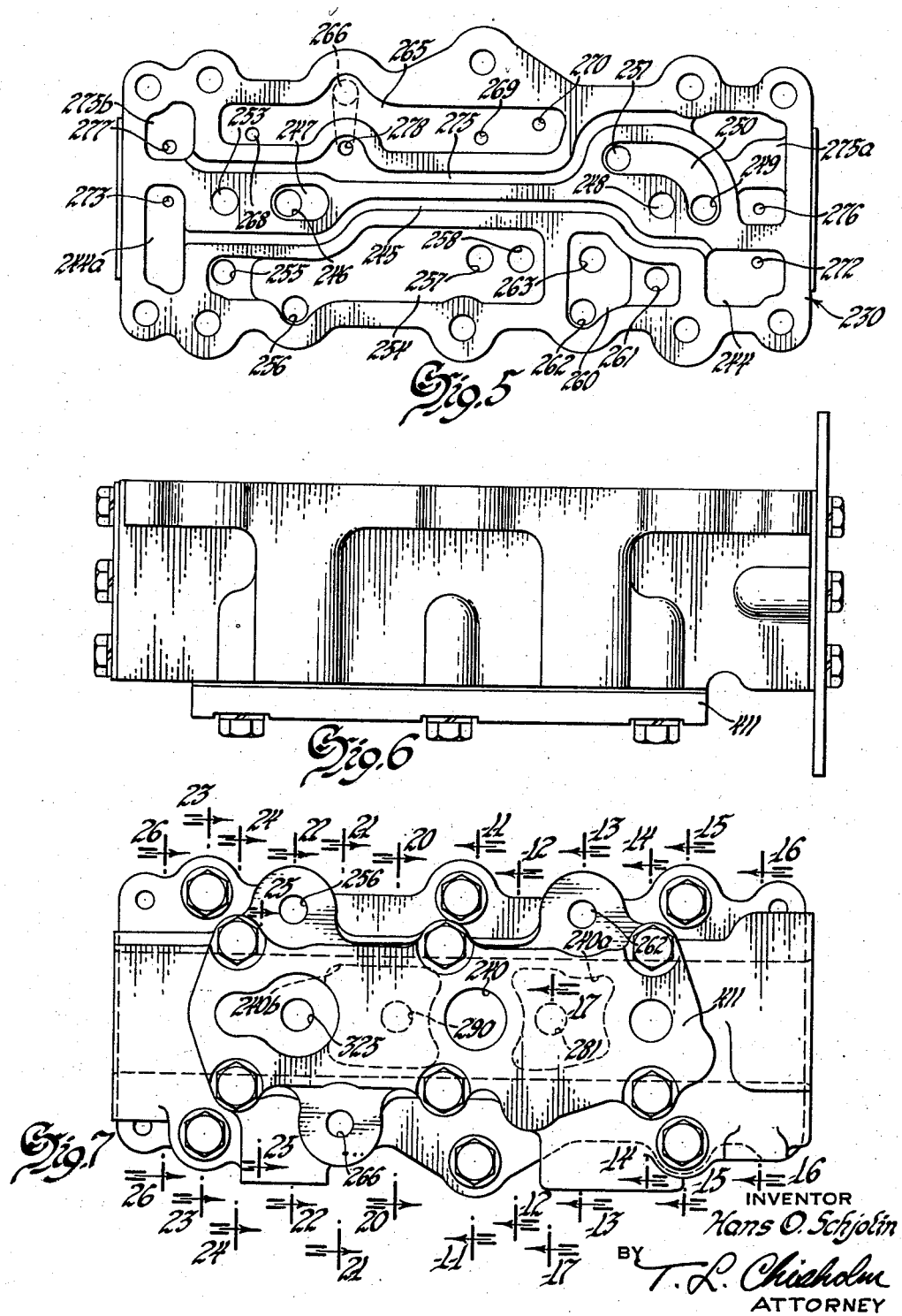

March 24, 1959  H. O. SCHJOLIN  2,878,691
TRANSMISSION AND CONTROL SYSTEM
Filed May 3, 1954  15 Sheets-Sheet 8

INVENTOR
Hans O. Schjolin
BY T. L. Chisholm
ATTORNEY

INVENTOR
Hans O. Schjolin
BY
T. L. Chisholm
ATTORNEY

March 24, 1959 H. O. SCHJOLIN 2,878,691
TRANSMISSION AND CONTROL SYSTEM
Filed May 3, 1954 15 Sheets-Sheet 10

INVENTOR
Hans O. Schjolin
BY T. L. Chisholm
ATTORNEY

INVENTOR
Hans O. Schjolin
BY T. L. Chisholm
ATTORNEY

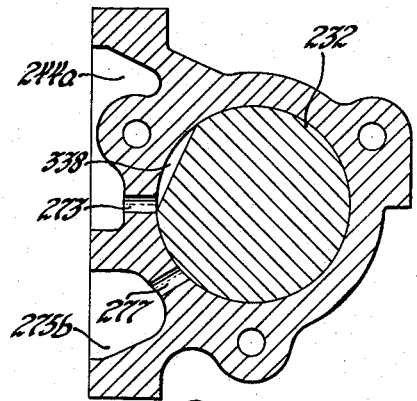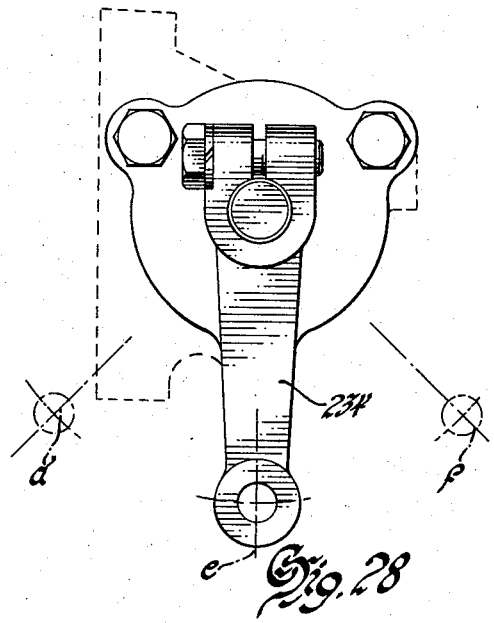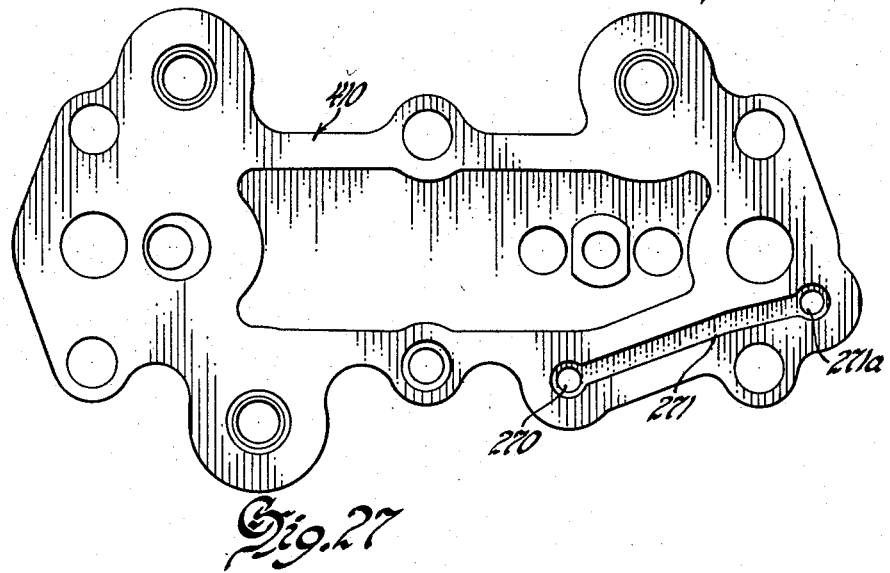

INVENTOR
Hans O. Schjolin
BY T. L. Chisholm
ATTORNEY

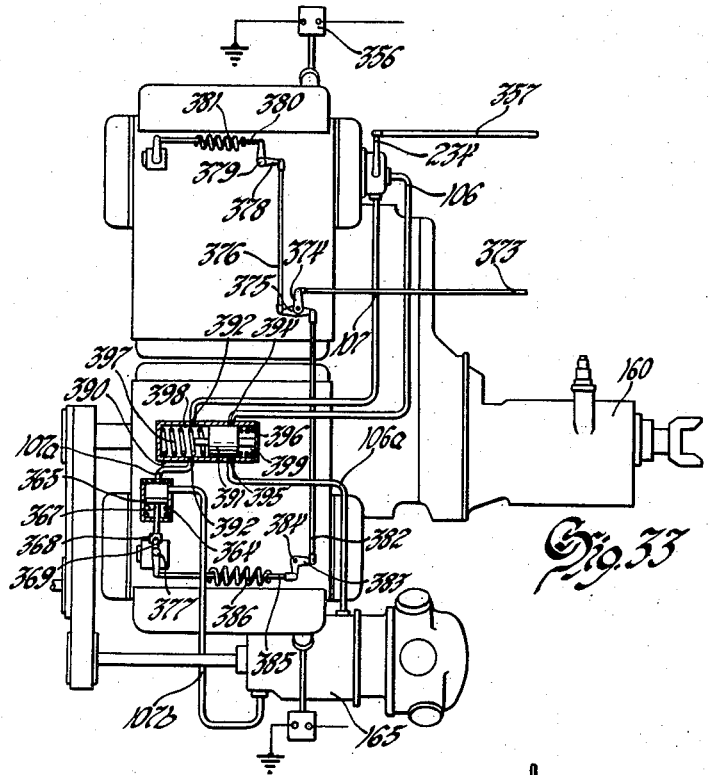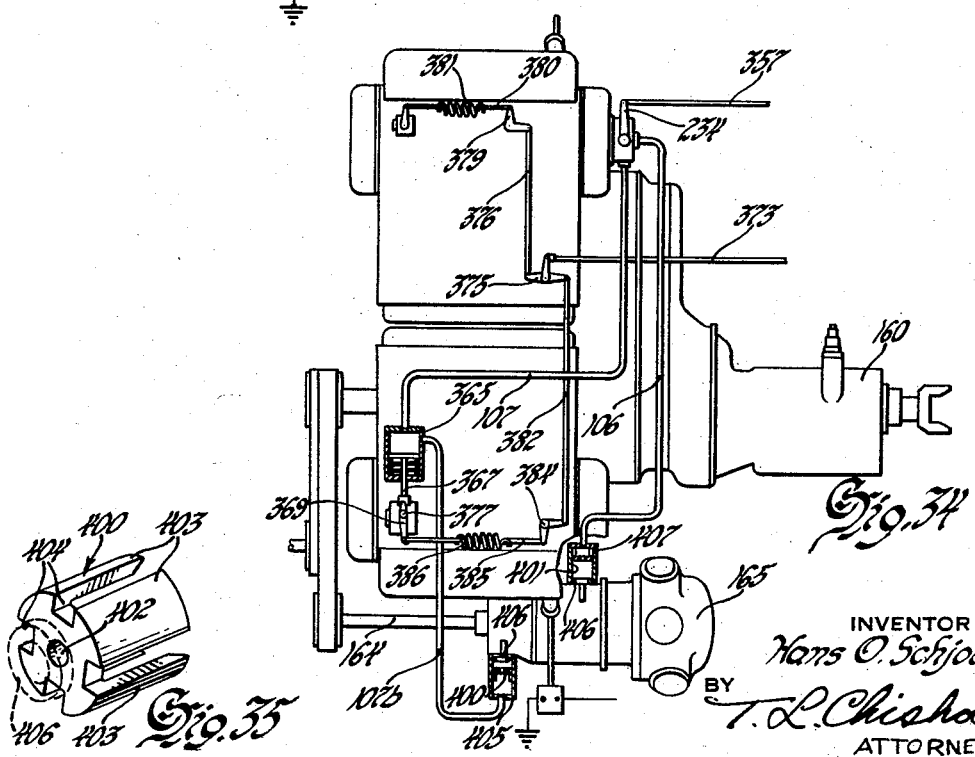

United States Patent Office 2,878,691
Patented Mar. 24, 1959

2,878,691

TRANSMISSION AND CONTROL SYSTEM

Hans O. Schjolin, Birmingham, Mich., assignor to General Motors Corporation, Detroit, Mich., a corporation of Delaware Application May 3, 1954, Serial No. 427,005

31 Claims. (Cl. 74—675)

This invention relates to transmission drive arrangements and to control systems therefor. The transmission drive and control system is particularly adapted for use in heavy duty vehicles such as busses, but may be used in other applications as desired. The invention includes an auxiliary transmission having controls interlocked with the controls of the vehicle drive transmission for limiting the drive ratio of the auxiliary transmission to a predetermined drive ratio when the vehicle transmission is effective to drive the vehicle and for permitting the auxiliary transmission to be driven in a different drive ratio when the vehicle transmission is ineffective to drive the vehicle.

An object of this invention is to provide a dual engine drive system wherein a pair of engines may be operated simultaneously to drive a common power shaft and wherein either engine may be quickly and easily disconnected from the drive train to provide drive through one engine only.

Another object of this invention is to provide a dual engine drive system incorporating hydraulic torque transfer mechanism in the drive train and incorporating valve mechanism operable to selectively disconnect either of the engines from the drive system while permitting drive through the engine not so disconnected.

A further object of this invention is to provide a dual engine drive system wherein each engine is operatively connected to a common output shaft by means including hydraulic torque transmitting mechanism driven by each engine and wherein air under pressure may be selectively directed to the hydraulic torque transfer mechanism driven by either engine to disconnect one engine from the vehicle drive train.

An additional object of this invention is to provide a dual engine drive system wherein a pair of engines are operatively connected to a common power shaft by means including hydraulic torque transfer mechanism and wherein the common power shaft drives a two-speed clutch unit adapted to selectively provide neutral or one of a plurality of drive ratios together with means operable to selectively disconnect either engine from the drive system while permitting drive by the other engine.

Yet another object of this invention is to provide a dual engine drive system including a common power shaft operably connected to both engines by hydraulic torque transfer mechanism, a two-speed clutch unit driven by the common power shaft adapted to selectively provide neutral or one of a plurality of drive ratios and a plural speed transmission unit driven by the clutch unit.

A further object of this invention is to provide a simplified and improved control valving and follow-up mechanism for controlling the two-speed clutch unit.

Another object of this invention is to provide an improved fill and dump control for a hydraulic torque transfer unit wherein control valving is arranged to direct fluid under pressure to the torque transfer unit during normal operation and wherein the control valving is arranged to direct a mixture of air and oil to the torque transfer unit to render the torque transfer unit incapable to transfer torque.

A particular object of this invention is to provide a control system for a hydraulic torque transfer unit having control valving adapted to provide continuous circulation of oil through the torque transfer unit in its normal operative running condition and to provide continuous circulation of air and oil through the torque transfer unit to render the torque transfer unit incapable of transmitting torque.

A more particular object of this invention is to provide a control system for a hydraulic torque transfer unit of the class described effective in normal operation to continuously deliver oil to the outer zone of the torque transfer unit and to simultaneously continuously withdraw oil from the inner zone of the torque transfer unit, the control system being effective to supply a mixture of air and oil to the inner zone of the torque transfer unit and to simultaneously withdraw oil from the outer zone of the torque transfer unit to render the torque transfer unit incapable of transmitting torque.

Another object of this invention is to provide in combination in a dual engine vehicle power train having torque transmitting mechanism driven by each engine and having an air conditioning compressor unit driven by one of said engines through an auxiliary two-speed transmission unit, valve means effective in one operative position to provide drive from both of said engines through said hydraulic torque transfer mechanism and to simultaneously establish drive of said compressor in a predetermined drive ratio in the auxiliary transmission, said valve means being effective in another position to provide drive from one engine only through one hydraulic torque transfer mechanism and to simultaneously establish a different drive ratio in the auxiliary transmission unit.

An additional object of this invention is to provide in a dual engine vehicle drive system having a fluid coupling unit driven by each engine, a pump driven by the output shaft of one fluid coupling unit, valve means effective to establish drive through both coupling units simultaneously or to establish drive through either coupling unit selectively, and means connecting the output shafts of the fluid coupling units to each other to render the pump operative irrespective of the position of the valve means.

A further object of this invention is to provide in combination in a dual engine vehicle drive system having a two-speed clutch unit and plural speed gear box driven by the clutch unit, governor means effective in certain drive ratios to limit the engine speed to a predetermined maximum speed and to provide controls automatically operative in another drive ratio to limit the engine speed to a different maximum permissible speed.

Another object of this invention is to provide in a transmission control system having manually operable means for selecting transmission drive ratio, means normally effective to prevent shift of transmission drive ratio, and brake pedal actuator release mechanism effective when the vehicle brake pedal is depressed to permit shift of transmission drive ratio.

An additional object of this invention is to provide in a control system for a plural speed transmission unit, means for controlling the transmission drive ratio, and means effective to limit the permissible engine speed when the transmission is operated in one drive ratio and to permit a higher engine speed when the transmission is operated in a different drive ratio.

A further object of this invention is to provide in a control system for an engine driven transmission, means for selecting the transmission drive ratio, means for limiting engine speed in one transmission drive ratio and for permitting a higher engine speed in a different transmission drive ratio, and means for preventing drive through the transmission in more than one drive ratio at any given time.

Another object of this invention is to provide in a control system for a transmission, a valve operable to direct fluid pressure to a transmission to select transmission drive ratio, fluid pressure responsive means effective to limit engine speed in one predetermined drive ratio and to permit higher engine speed in another drive ratio, and timing valves for controlling the rate of admission of fluid pressure to and exhaust of fluid pressure from the transmission to control the rate of shift of transmission drive ratio.

These and other objects and advantages of this invention will be apparent from the following specification and claims taken in conjunction with the drawings in which:

Figure 1a is an enlarged view of the two-speed clutch and actuator mechanism shown in Figure 1;

Figure 1b is an enlarged sectional view of one oil distributor plug illustrated in Figure 1;

Figure 1c is a sectional view of the oil distributor plug of Figure 1b taken along the line 1c—1c of Figure 1b;

Figure 1d is an enlarged sectional view of a second oil distributor plug shown in Figure 1;

Figure 1e is a sectional view of the oil distributor plug of Figure 1d taken along the line 1e—1e of Figure 1d;

Figure 2 is a schematic diagram of the control mechanism for the two-speed clutch unit illustrating the two-speed clutch unit in direct drive;

Figure 3 is a schematic diagram of a hydraulic control system for controlling the hydraulic torque transmitting mechanism, the two-speed clutch unit, and for controlling the drive ratio of an auxiliary transmission for driving an air conditioning compressor;

Figure 5 is a plan view of a control valve housing with the cover removed;

Figure 6 is a side view of the control valve housing of Figure 5 with the cover attached;

Figure 7 is a bottom view of the control valve housing of Figure 6;

Figure 26 is a sectional view taken along the line 26—26 of Figure 7;

Figure 27 is a plan view of a pad for mounting the valve cover to the valve housing;

Figure 28 is an end view of the valve control assembly of Figure 8 illustrating the handle for rotating the operating valve in the valve housing;

Figure 31:
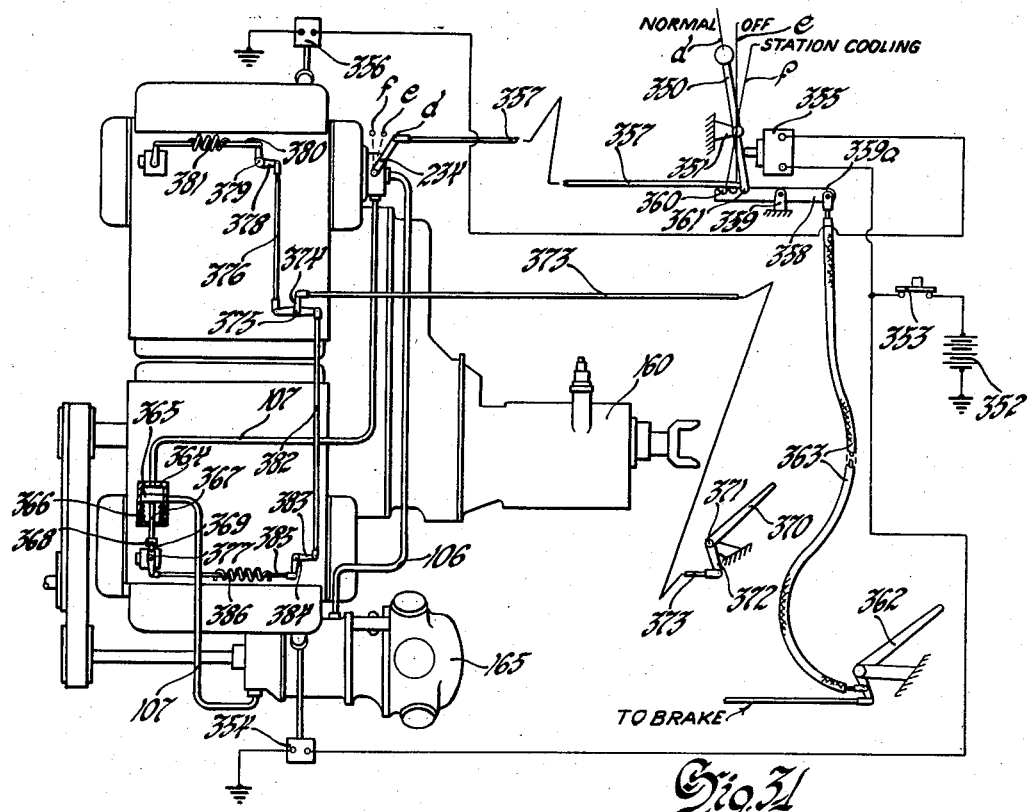
Figure 32:
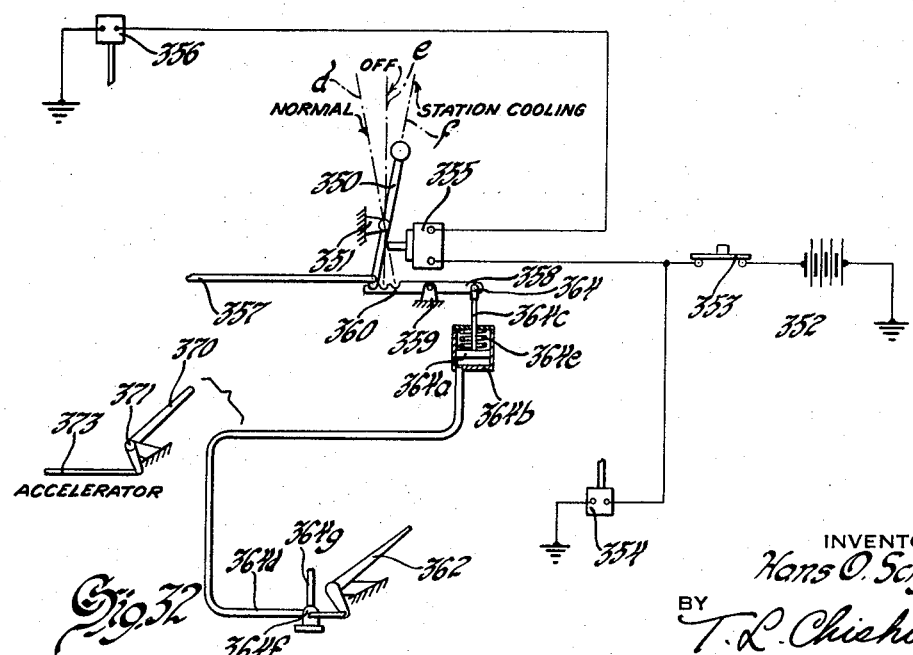

Figure 31 is a schematic diagram of the external controls for the auxiliary compressor transmission illustrating interlock safety features whereby shift of ratio of the compressor transmission is prevented whenever the vehicle brake pedal is depressed and whereby the vehicle accelerator pedal is rendered ineffective to speed up the vehicle engine above a predetermined speed of revolution when the auxiliary compressor transmission is operated in overdrive;

Figure 32 is a schematic diagram illustrating an alternate form of brake pedal release mechanism for the control lever for selecting the auxiliary compressor transmission drive ratio;

Figure 33 is a schematic diagram of the control system for the compressor transmission illustrating fluid pressure controlled means for limiting the permissible engine speed when the compressor transmission is in one selected drive ratio and for preventing more than one compressor transmission drive ratio from being established at one time;

Figure 34 is a schematic diagram of the control system for the compressor transmission incorporating timing valves for controlling the rate of admission to and discharge of pressure from the transmission servos;

Figure 35 is a perspective view of one of the two similar timing valves of Figure 34.

Figure 1:
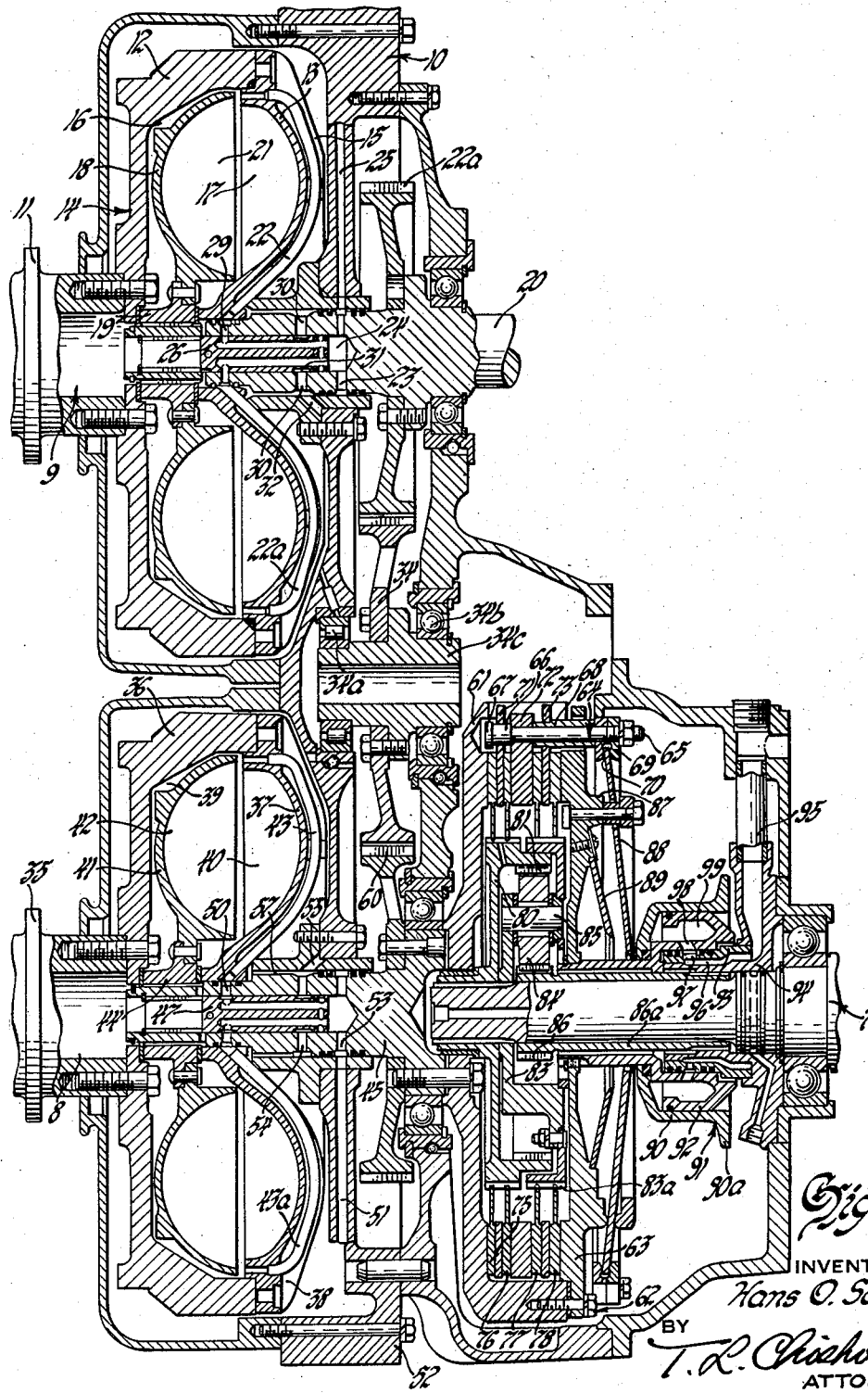
Figure 1 is a transverse view illustrating the vehicle dual engine fluid coupling and two-speed clutch drive train.

Referring to Figure 1, there is shown a transmission arrangement whereby a pair of engines (not shown) may be individually or simultaneously connected in torque transfer relationship with a power shaft adapted to drive vehicle. At the top of Figure 1, there is shown a power input shaft 11 adapted to drive an impeller 13 of a fluid coupling unit indicated generally as 14. The impeller unit 13 being connected to the shaft 11 by means of a drive member 12. A housing portion 15 fastened to member 12 and rotatable therewith, together with member 12, enclose a chamber 16 adapted to be filled with working fluid. Impeller 13 carries blades 17. A turbine member 18 is secured to a hub 19 which in turn is splined to a power delivery shaft 20. The turbine member 18 is furnished with a series of blades 21. A tube 22 secured to the housing portion 15 extends from the base of the impeller member 13 to the outer periphery of the impeller 13 for purposes hereafter more fully explained. The shaft 20 is provided with a transverse port 23 which may establish communication between a chamber 24 in shaft 20 and a passage 25 in the transmission housing indicated generally at 10. The chamber 24 in shaft 20 has positioned therein a spindle member 26 having axial passages 27 and 28 (see Fig. 1b). An annular port 29 extends transversely through shaft 20 to establish communication between passages 27 and 28 and the tubes 22 and 22a. A transverse annular port 30 on shaft 20 provides for fluid flow communication between the base of chamber 16 and a passage 32 (see Fig. 1b).

Referring to Figures 1b and 1c, details of spindle 26 are shown. As stated, passages 27 and 28 extend longitudinally partially through the spindle. A pair of passages 58 and 59 (see Fig. 1c) are spaced 90° from passages 27 and 28 in spindle 26, there being an annular groove 31 on spindle 26 communicating with passages 58 and 59. An annular groove 82 on spindle 26 communicates with passages 27 and 28.

In normal operation, fluid under pressure is supplied to the coupling chamber 16 of Figure 1 through passage 25, port 23, chamber 24, passages 27 and 28, groove 82, port 29 and to the outer periphery of chamber 16 through tubes 22 and 22a. At the same time oil is withdrawn from the inner periphery of chamber 16 through passage 33, port 30, annular passage 31 and port 32. Port 32 in normal operation is connected to the sump through control valving hereafter more fully explained. Passage 25 is normally connected to a fluid pressure source through control valving hereafter to be described. Passages 58 and 59 communicate with a chamber 9 of Figure 1 and in normal operation chamber 9 of Figure 1 is connected to passage 32 through passages 58 and 59.

When it is desired to render the fluid coupling unit inoperative to transfer torque from the power shaft 11 to the driven shaft 20, a mixture of air under pressure and oil may be supplied to the working chamber 16 through passage 32, this mixture being transferred through passage 30 and through a passage 33 to the base of the working chamber 16. The mixture of air and oil is also conducted to chamber 9 through passages 58 and 59. At the same time working fluid may be discharged from chamber 16 by way of tubes 22, 22a, annular port 29, passages 27 and 28, chamber 24, passage 23 and passage 25 in the housing 10. The control valving for controlling the fill and dump of chamber 16 will be hereafter more fully explained.

Referring again to Figure 1, fixed to shaft 20 is a drive gear 22a which is in constant mesh with a torque transfer gear 34. A second engine (not shown) is provided to drive a power input shaft 35 which is adapted to drive an impeller 37 by means of a drive hub 36. A housing 38 secured to hub 36 to rotate therewith, together with drive hub 36, enclose a working chamber 39 in which is positioned the impeller 37 and a turbine member 41. A series of blades 40 are provided on impeller 37 and a series of blades 42 is provided on turbine 41. The impeller 37 carries a tube 43 extending from the base of the impeller to the outer periphery of the working chamber 39. Turbine 41 is secured to a hub 44 which in turn is splined to a power delivery shaft 45. As shown in Figure 1d, shaft 45 is drilled out to provide a chamber 46 and a spindle member 47 is positioned within the chamber. As shown in Figure 1d, spindle 47 has drilled therein a pair of passages 48 and 49 which communicate with chamber 46 and which also communicate with tubes 43 and 43a by means of an annular transverse port 50 drilled in shaft 45. Chamber 46 communicates with a passage 51 in the transmission housing section 52 by means of a transverse port 53 drilled in shaft 45. A transverse passage 54 drilled in shaft 45 provides communication between the base of the working chamber 39 and a passage 55. Oil seals 56 are provided on shaft 45 between passages 53 and 54 to prevent leakage between these passages. As shown in Figures 1d and 1e, the spindle 47 is the same in structure as spindle 26. The spindle 47 is provided with passages 48 and 49 and also with passages 74 and 79. In normal operation, oil is supplied to the outer periphery of chamber 39 of Figure 1 through a passage 51, passage 53, chamber 46, passages 48 and 49, passage 50 and tubes 43 and 43a. At the same time oil is withdrawn from the inner periphery of chamber 39 through chamber 8 of Figure 1, passages 74 and 79 (see Fig. 1d), a passage 57, passage 54, an annular groove 54a on spindle 47 and passage 55. Passages 55 and 51 are connected to control valving as hereafter more fully explained. When it is desired to render the fluid coupling unit inoperative for torque transfer purposes, a mixture of air and oil under pressure may be supplied to the working chamber 39 at the base of the working chamber by means of passage 55, passage 54, longitudinal passage 57 and passages 74 and 79. This air and oil mixture is also supplied to chamber 8 of Figure 1 through passages 74 and 79 of Figure 1d. At the same time that the mixture of air and oil is being supplied to the working chamber 39 of Figure 1 at the base thereof, the working fluid which previously filled the chamber 39 may be discharged from the outer periphery of chamber 39 by way of tubes 43 and 43a, transverse passage 50, longitudinal passages 48 and 49, chamber 46, passage 53, and passage 51 in the transmission housing portion 52. Control valving for controlling the operation of the fluid coupling unit (not shown) will be hereafter more fully disclosed and described.

Referring to Figure 1, power delivery shaft 45 has secured thereto a gear 60 which is constantly in mesh with the torque transfer gear 34. Gear 34 is carried by a hub 34c supported by bearings 34a and 34b in the transmission housing. Also, fixedly secured to shaft 45 is a drive hub 61 of a two-speed clutch unit indicated generally at 62. The drive hub 61 extends radially outwardly from the end of shaft 45 and then annularly longitudinally of the shaft. At the end of the annular extension of the drive hub, there is bolted thereto a radially inwardly extending member 63. Carried by the drive member 61 is a bolt 64 having a reduced stem section 65, a raised boss 66 and an additional raised boss 67. The reduced stem section 65 extends through a hollow sleeve 68 and carries an actuating member 69 having a slotted portion 70 for purposes hereafter more fully explained. A presser plate 71 is carried by the boss 66 of bolt 64 and is axially movable with respect to the boss 66. A presser plate 72 is carried by the stem portion 65 of bolt 64 and is held in fixed relationship with respect to bolt 64, being positioned between one end of raised boss 66 and one end of sleeve 68; thus, when bolt 64 is moved axially with respect to drive hub 61, the presser plate 72 will be moved with the bolt. A presser plate 73 carried by sleeve 68 floats on the sleeve so that the bolt may be axially movable with respect to the presser plate. Presser plate 71 is positioned between a pair of clutch plates 75 and 76. Presser plate 73 is positioned between a pair of clutch plates 77 and 78. Presser plate 72 is positioned between clutch plate 76 and clutch plate 77. A drive member 80 is splined to the clutch plates 75 and 76 in such manner that the clutch plates may move axially along member 80, but will drive the member 80 when the presser plate 72 is moved to engage the clutch plate 76. Member 80 has formed thereon a ring gear 81 and is splined to a power delivery shaft 7 to drive the shaft 7. The clutch plates 77 and 78 are splined to an extension 83a of a planet carrier 83, the clutch plates being axially slidable along the carrier by being arranged to drive the carrier when the presser plate 72 is moved into engagement with clutch plate 77. Thus, the presser plates 71 and 73 and the clutch plates 75, 76, 77 and 78 comprise stacked assemblies which may be axially moved by action of presser plate 72 to provide smooth clutch engagement and a clutch having a long life with minimum wear. The planet carrier 83 has rotatably mounted thereon a series of planet gears 84 carried by stub shafts 85. A sun gear 86 is formed integrally with a sleeve member 86a which is splined to the transmission housing so as to be held against rotation. The planet carrier 83 is rotatable with respect to shaft 7. Planet gear 84 is in constant mesh with ring gear 81 and with sun gear 86.

When the clutch plates 75 and 76 are engaged by presser plates 71 and 72, the two-speed clutch unit is operated in direct drive, the drive being from drive hub 61 through the clutch plates 75 and 76 and through member 80 to the shaft 7. When the clutch plates 77 and 78 are engaged by presser plates 72 and 73, the two-speed clutch unit is in overdrive. In this condition of operation, the drive is through the planet carrier extension 83a through the planet gears 84 and ring gear 81, to member 80, to shaft 7. When the power is applied to the planet carrier and the sun gear is fixed against rotation, the ring gear is rotated more rapidly than the planet carrier to give overdrive operation.

Secured to the inwardly extending member 63 is a boss 87 which carries a stiff spring member 88, the spring member 88 being a belleville type of spring which extends between the slots 70 of member 69 and a piston 90 of a fluid pressure controlled servo unit indicated generally at 91. Also, carried by member 63 is a helper spring 89, the purpose of which will be hereafter more fully explained. Member 63 is splined to an extension of a cylinder member 92 to cause the cylinder member to rotate with the member 63. A sleeve 93 is positioned between an axially extending portion 94 of the housing and the cylinder 92. A passage 95 in the housing communicates with a passage 96 between the sleeve 93 and housing portion 94, there being a passage 97 in sleeve 93 and a passage 98 in cylinder 92 to permit fluid under pressure to be admitted to a chamber 99 within the cylinder 92. When fluid pressure is admitted to passage 95 and through passage 96 to chamber 99, piston 90 is moved against spring member 88, the spring member 88 being pivoted about hub 87 to cause the presser plates 72 and 73 to engage clutch plates 77 and 78 to establish overdrive operation. When fluid pressure is exhausted from chamber 99, the spring 88 reacting upon piston 90 biases the pressure plates 72 and 71 into contact with clutch plates 75 and 76 to establish direct drive operation. Helper spring 89 strikes belleville spring 88 when overdrive is established. When fluid pressure is released from chamber 99, helper spring 89 biases spring 88 over center so that spring 88 will be effective to establish direct drive by its "oil can" effect. The two-speed clutch unit 62 drives a shiftable transmission unit 160 shown schematically in Figure 31, 33 and 34. The gear box 160 may be of a manually shiftable type of common construction well known in the art.

As hereafter more fully explained, a control system is provided whereby neutral, direct or overdrive operation of the two-speed clutch unit may be selected. It will readily be understood that when both the chambers 16 and 39 are filled with working fluid such as oil, the power from both engines will be transmitted from shaft 45 to the power shaft 7 through the two-speed clutch unit. In the event that it is desired to cut either engine out of the drive train, either chamber 16 or 39 may have the quantity of working fluid quickly forced out by means of air pressure directed through the tubes 22, 22a or 43, 43a, as explained. The drive system is particularly useful for heavy duty applications such as may be found in busses, for example, wherein drive through either engine may be obtained in the event of engine failure by one engine. Thus, if one engine should fail on the highway, the driver of the bus can quickly and easily cut that engine out of the drive train and continue his trip on the remaining engine.

The arrangement is particularly useful for busses wherein an air-conditioning compressor is driven from one engine. With the bus standing at the station, the driver may cut one engine out of the drive train while at the same time continuing to drive the compressor with his remaining engine.

In Figure 2 there is shown a schematic diagram of a clutch control system for controlling the two-speed clutch unit of Figure 1. The parts illustrated in Figure 2, corresponding to those shown in Figure 1, are given the same number as those applied in Figure 1. As shown, a pressure supply passage 103 is branched at 124 to admit actuating pressure to a chamber 118 of an accumulator 129 having a piston 119, there being a spring 120 for biasing the piston against the action of pressure in chamber 118. The piston 119 is slidably mounted on a support shaft 123 and is provided with a sleeve extension 121 surrounding the shaft 123. A boss 122a is provided on an end cap 122 of the accumulator to limit the permissible movement of piston 119 against spring 120. Fluid pressure supplied to passage 103 by any means such as a pump (not shown) is directed by passage 103 to the accumulator and to a port 125 of a control valve 130. The valve 130 is a sleeve member which is threadably screwed to a stem 134 so that the sleeve valve member 130 having lands 131 and 132 may be adjusted axially along the stem 134. A pin 135 may lock the valve member 130 and a stem 134 against relative movement once the proper adjustment of the valve on the stem has been obtained. A spring 136 seated upon a ring 137 and upon a ring 138 yieldably biases the valve 130 to a neutral adjustment position. Passage 95, which is connected to chamber 99 of the clutch actuating servo, terminates at port 126 of the valve 130. An exhaust port 127 is provided so that fluid pressure may be exhausted from chamber 99 of the clutch actuating servo. When the pressure is exhausted from chamber 99, the belleville spring 88 reacts upon piston 90 and positions the pressure plates 72 and 71 into contact with clutch plates 76 and 75 to establish direct drive through the two-speed clutch unit. The piston 90 is provided with an upstanding flange 90a which contacts a follower sleeve member 152 which is secured to a crank member 150 by means of a pin 151. Crank member 150 is pivoted at 144 to a plunger member 140 slidably positioned within a casing 139. The end 153 of the crank member 150 forms a ball joint connection to the stem member 134. The crank member 150 extends through a slot 141 in casing 139. Plunger 140 has fixed thereto a pair of spaced pins 142 and 143. A wedge cam member 156 extends through slot 141 in casing 139 between the pins 142 and 143. The cam 156 is actuated by the vehicle clutch pedal 155 (see Fig. 29) and is arranged such as when the clutch pedal is fully depressed, the cam is forced between pins 142 and 143 to move plunger 140, the crank member 150 and valve 130 to a neutral position wherein none of the clutch plates are applied. As the clutch pedal is released so that the cam member 156 is partially withdrawn from the space pins 142 and 143 as shown in Figure 2, the two-speed clutch unit will be either in direct drive or overdrive as controlled by a solenoid valve 110.

A passage 104 may be supplied with control of pressure from any suitable source such as a pump (not shown) to supply actuating pressure to the solenoid valve 110. A driver operable switch 112 may be utilized to manually select either direct drive or overdrive operation. The solenoid valve is made up of a plunger 115 which is biased by a spring 117 to block off passage 104 and to connect a passage 105 to exhaust through an exhaust passage 111. When the switch 112 is open, the solenoid coil 114 is de-energized so that spring 117 moves valve member 115 to the position shown in Figure 2. With the valve member 115 biased by the spring 117 to close off passage 104, the passage 105 is connected to exhaust through a passage 116 and passage 111. When the driver operable switch 112 is closed, the battery 113 energizes the solenoid coil 114 to move the valve member 115 upwardly to cut off exhaust passage 111 and to connect passage 104 to 105. When fluid pressure is admitted to chamber 148 at the end of plunger 140, the plunger 140 will be moved against the action of spring 145 seated upon retainer 147 and will move arm 150 and valve member 130 to connect passage 103 to passage 95 through ports 125 and 126. With fluid pressure in chamber 99, the piston 90 is effective to cause the belleville spring 88 to apply clutches 77 and 78 to provide overdrive operation in the two-speed clutch unit.

The action whereby control of valve member 130 is achieved is brought about by moving the pivot point 144 axially in one direction or another to achieve the desired result. For example, in changing from direct drive operation to overdrive operation, pressure admitted to chamber 148 moves the pivot point 144 and the ball connection 153 to the left, thereby moving land 131 of valve 130 to the left to block off exhaust port 127 and to admit fluid under pressure from port 125 to passage 95 through port 126. When fluid pressure is admitted to chamber 99 to force piston 90 to the left, the follower slipper 152 also moves to the left carrying the pivot point 151 in the same direction with the result that the upper end of the crank arm 150 at ball joint 153 is moved to the right thereby partially closing the port 126 from port 125. The port 126 is not completely closed off from port 125 so that sufficient oil from the supply passage 103 and accumulator chamber 118 may still be supplied to chamber 99 to hold the piston 90 in its overdrive engaged position even though there may be slight leakage of oil either from the chamber 99 or through exhaust port 127 back to the transmission sump.

Figure 29:
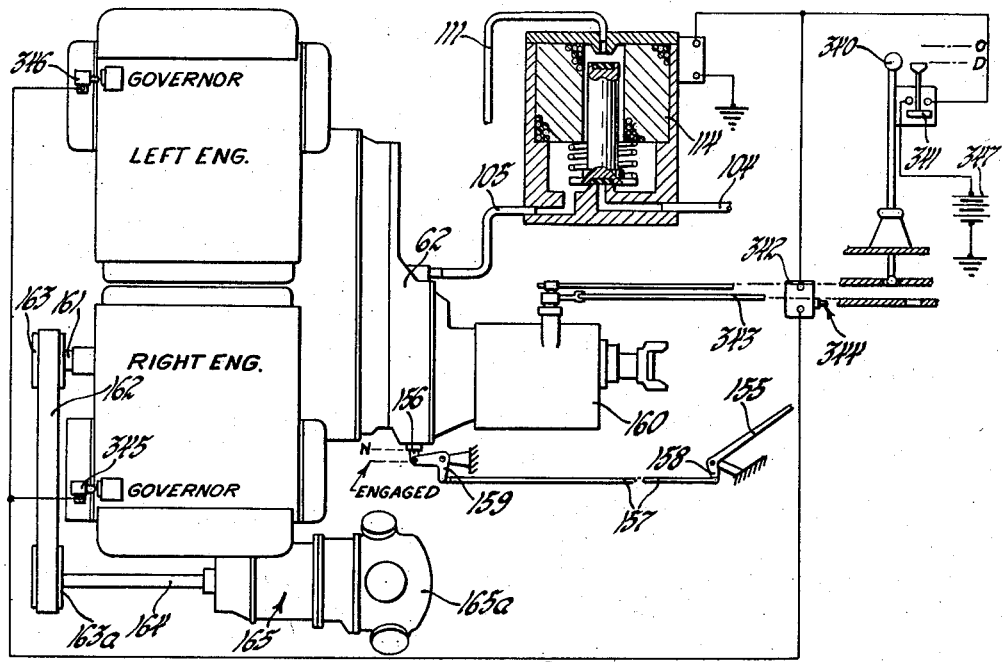
Figure 29 is a schematic diagram of control mechanism for the two-speed clutch unit, for the auxiliary compressor transmission unit, and for controlling engine governors.

As stated, to obtain neutral operation of the two-speed clutch unit, the cam member 156 is forced downwardly by the vehicle clutch pedal 155 of Figure 29. When the cam member 156 is moved downwardly, it can engage either pin 142 or pin 143, depending upon whether the member 140 is in its direct drive or overdrive position. In either event, the pivot point 144 of arm 150 is moved to the position wherein the land 131 of valve 130 will uncover port 126. If the transmission is operating in direct drive at the moment the clutch pedal is depressed, the pivot point 144 will be moved to admit pressure from passage 103 to passage 95 through ports 125 and 126. As soon as piston 90 moves spring 88 to disengage all of the clutch plates, the follower slipper 152 will permit valve land 131 to cut off port 126 to trap oil in chamber 99 to establish neutral. In the event that the transmission has been operating in overdrive at the moment the clutch pedal is depressed, the cam 156 will move the member 40 and the pivot point 144 to connect port 126 to exhaust port 127. As soon as piston 90 has moved to establish neutral condition of operation, the action of the follower slipper 152 in conjunction with piston 90, is to position land 131 of valve 130 to cut off exhaust port 127 and to trap the remaining pressure in chamber 99. Thus, the action of the valve 130 in neutral is that of a follow-up valve which functions to prevent engagement of either the direct drive plates or the overdrive plates.

Referring briefly to Figure 29, there is shown schematically a clutch pedal 155 adapted to control the cam member 156 through a rod 157. In Figure 29, the clutch pedal is illustrated as being depressed or in its neutral position so that the cam member 156 is forced inwardly between the pin members 142 and 143 of Figure 2. When the clutch pedal 155 of Figure 29 is released, the bell crank arms 158 and 159 are actuated to partially withdraw the cam member 156 from the space between pin members 142 and 143 as illustrated in Figure 2. As heretofore stated, in addition to the two-speed clutch unit 62 heretofore described, the power train also includes a manually shiftable gear box 160 which is driven by the power shaft 7 of Figure 1. Gear changes in the manually shiftable gear box 160 may be accomplished when the clutch pedal 155 is depressed to force the cam member 156 of Figure 2 into the space pins 142 and 143 in the manner described heretofore.

Also shown in Figure 29 is a two-speed compressor transmission unit 165 for driving an air conditioning compressor 165a which may be driven from either engine, but is illustrated as being driven from a suitable power take-off shaft 161 of the right engine. The transmission drive shaft 164 may be belt driven by belt 162 operating on suitable pulleys 163 and 163a. Shaft 164 drives a two-speed compressor transmission unit 165 hereafter more fully described.

Figure 4A:
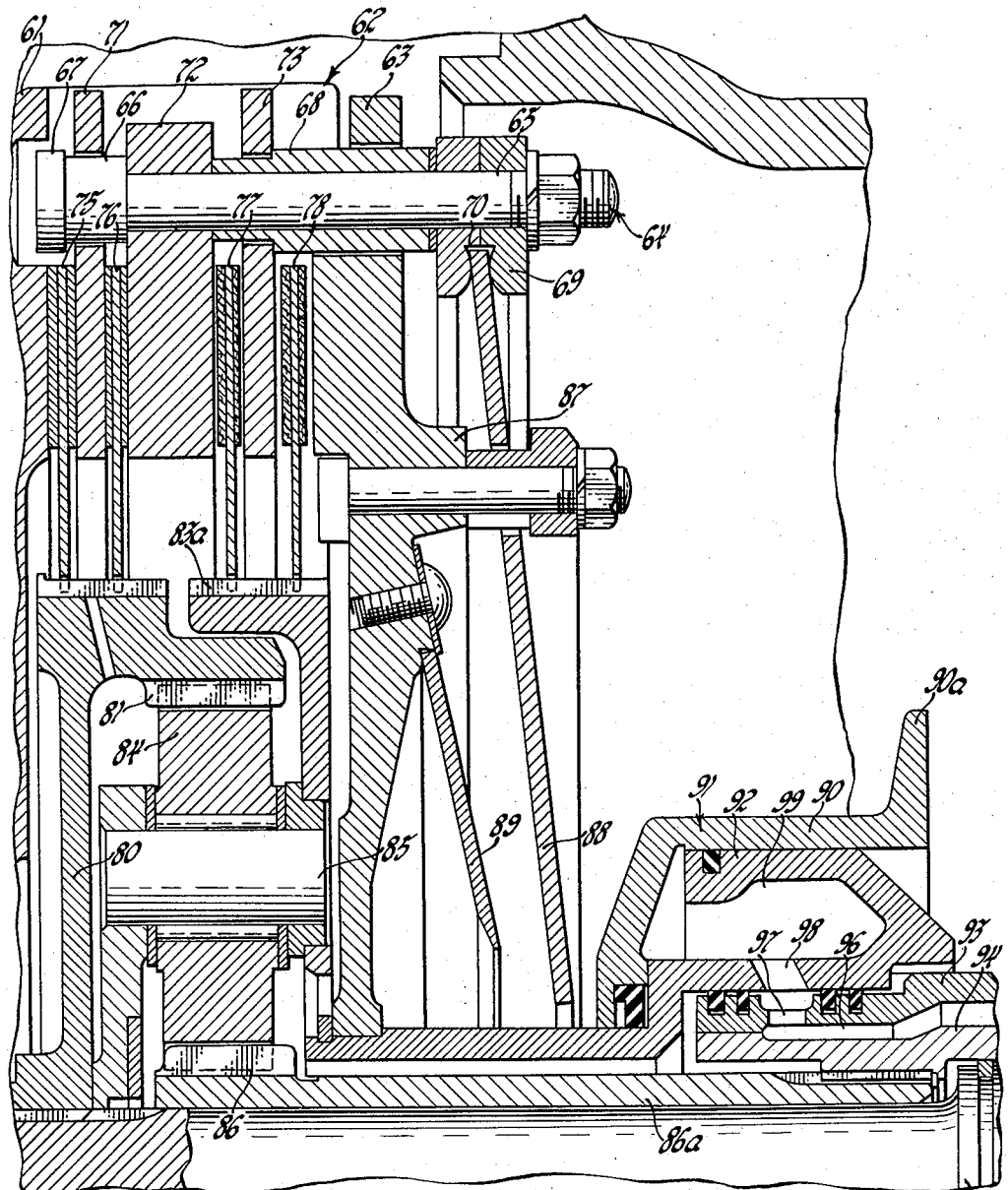
Figure 4 is a transverse sectional view of an auxiliary two-speed transmission for driving an air conditioning compressor.

Referring to Figure 4, there is shown a sectional view of a two-speed transmission unit 165 for driving an air conditioning compressor in either direct drive or overdrive, and also for driving a condenser fan in either direct or overdrive.

The transmission power drive shaft 164 is supported in housing 200 by means of a bearing 201 and is journalled in power output shaft 225. A planet carrier 202 is fixed to shaft 164 to be rotatably driven by shaft 164. An extension 204 of planet carrier 202 carries stub shafts 203, which rotatably support a planet gear 205 on the carrier. A plurality of gears 205, preferably three, may be supported on carrier 202. Carrier extension 204 carries a plurality of clutch plates 206, plates 206 being splined to extension 204 to rotate therewith, but being axially movable along extension 204. A drum member 207 carries a series of clutch plates 208 adapted to engage clutch plates 206 when direct drive is desired. Drum 207 is shaped to form a cylinder 209 and a sun gear 210. A piston 211 disposed in cylinder 209 is adapted to engage the clutch plates 206—208 to establish direct drive when fluid pressure is admitted to a control chamber 212. A spring 213 yieldably biases piston 211 to release the clutch plates when chamber 212 is connected to exhaust. A drum 214 has secured thereto a ring gear 215 which meshes with planet gear 205. Thus, planet gear 205 is constantly in mesh with sun gear 210 and ring gear 215. An extension 216 of drum 214 is adapted to be braked by a band 217 to stop rotation of ring gear 215 when overdrive operation is desired. The band servo 218 shown schematically in Figure 3 is arranged to apply the band to drum to establish overdrive operation when fluid pressure is supplied to the servo through passage 107 of Figure 3. When passage 107 of Figure 6 is exhausted, the drum is released and unable to prevent rotation of the drum 216 of Figure 4. Servo 218 may be of conventional construction and accordingly its details are not shown.

Drum 207 is fixed to power output shaft 225 to drive shaft 225 in either direct or overdrive operation. A sleeve 226 is splined to output shaft 225 to drive a power take-off drive gear 219 which meshes with a gear 220 carried by a shaft 221. Gear 219 is supported in a bearing 222 and shaft 221 is supported in a bearing 223. A pulley 224 on shaft 221 may be connected to a condenser cooling fan (not shown) for cooling the condenser of a vehicle air conditioning system. The shaft 225 is adapted to drive an air conditioning compressor unit (not shown).

If fluid pressure is exhausted from both the band servo and clutch servo at the same time, the compressor transmission will be unable to transfer torque and the air compressor and fan (not shown) will not be driven.

Referring to Figure 3, the control system arrangement for controlling the admission of fluid under pressure to the fluid coupling unit chambers 16 and 39 and also to the compressor transmission unit 165 is shown in schematic form. The compressor transmission unit 165 is driven by shaft 164 through a two-speed gearing arrangement which may provide either direct drive or overdrive operation of the compressor. The compressor transmission unit 165 is hydraulically controlled by suitable fluid pressure responsive servo units 218 of Figure 3 and 211 of Figure 4. When fluid pressure is supplied to passage 106 and when passage 107 is simultaneously connected to exhaust, the compressor transmission unit is driven in direct drive. When fluid pressure is supplied to passage 107 and passage 106 is simultaneously connected to exhaust, the compressor transmission unit is in overdrive. When fluid pressure is exhausted from both passages 106 and 107, the compressor transmission unit is in neutral and is not being driven even though the drive shaft 164 may be rotated through the belt drive.

Passage 106 is connected to clutch chamber 212 of Figure 4 and passage 107 is connected to servo 218 to apply band 217 to drum 216 of Figure 4 when pressure is supplied to passage 106.

In Figure 3, the control system is illustrated as conditioned to establish normal summer driving wherein both fluid coupling units are effective to transfer torque and wherein the air conditioning compressor transmission unit 165 is driven in direct drive. A pump 166 driven by shaft 20 is connected to the transmission sump 156a by means of a pump suction passage 157. Pressure discharged by pump 166 is supplied to a passage 100 branched at 101 to supply pressure for controlling the drive ratio of the air conditioning compressor transmission unit 165. Pressure from branch passage 102 of passage 101 is supplied through passage 103 to the accumulator chamber 118 and to the control valve 130 (see Figure 2) for controlling the drive ratio of the two-speed clutch unit. Branch passage 104 supplies fluid under pressure to the solenoid valve 115 which is adapted to either connect the passage 105 to exhaust for direct drive operation of the two-speed clutch unit 62 or to connect the passage 105 to passage 104 to establish overdrive operation of the two-speed clutch unit as heretofore described.

The control pressure in passage 100 and branch passages 101, 102, 103 and 104 is maintained at a predetermined value for example, 70 pounds per square inch by means of a pressure relief valve 167 which dumps pressure in excess of 75 pounds per square inch to a passage 168. Passage 168 extends to the air conditioning compressor transmission 165 to supply oil for lubrication purposes to the compressor unit. Lubrication supply passage 168 is branched at 168a to provide lubrication for the two-speed clutch and transmission unit. The passage 168 is also branched at 169 and 170 to supply oil under pressure to a control valve indicated generally as 232 and extends to a second control valve indicated generally as 231. Pressure in passages 168 and 169 is regulated at a predetermined pressure such as for example, 35 pounds per square inch by a pressure regulator valve 173. Pressure in excess of 35 pounds per square inch is dumped to the transmission sump by valve 173 through a passage 174.

At the bottom of Figure 3, there are shown schematically a pair of control valves termed an emergency valve 231 and an operating valve 232 for controlling the drive through the fluid coupling units and for controlling the drive ratio of the air conditioning compressor unit. The operating valve 232 shown schematically in the right hand half of the lower portion of Figure 3 may be positioned to select normal summer driving, normal winter driving or station operating condition. With the operating valve 232 positioned for normal summer driving, the valve performs five functions. In this position the valve 232 connects passage 170 to passage 171 to supply oil to the coupling chamber 16 and at the same time connects the oil return passage 172 to exhaust passage 108 through the restriction 267 so that oil is continuously circulated through the coupling. The valve also shuts off air pressure supply passage 175 so that no air may be supplied to the coupling chamber 16. In addition, the 75 pound pressure supply passage 101 is connected to passage 106 in a manner hereafter more fully explained to apply the direct drive servo of the air conditioning compressor unit to drive the air conditioning compressor in direct drive. The valve 232 also connects passage 107 to exhaust passage 108 in a manner hereafter more fully explained to dump any pressure from the overdrive servo unit of the air conditioning compressor. With the valve positioned for normal summer driving as described, oil is continuously circulated through the fluid coupling chamber 16 under pressure, and the air conditioning compressor unit is driven in direct drive. Passage 171 in the schematic diagram of Figure 3 is connected to passage 25 of Figure 1. Passage 172 of Figure 3 is connected to passage 32 of Figure 1. Thus, in normal operation, oil is supplied to the outer circumference of chamber 16 and is withdrawn from the inner periphery of chamber 16 in continuous restricted flow.

The operating valve 232 when positioned for normal winter driving supplies oil to chamber 16 of the coupling unit through passage 171 and connects passage 172 to exhaust to provide continuous circulation of oil through the chamber 16. The oil returned from chamber 16 through passage 172 is passed through the restriction 267 as heretofore described. The valve also in this condition of operation blocks off the air pressure supply passage 175 from the left hand engine fluid coupling. In the winter driving position both passages 106 and 107 leading to the air conditioning pressure transmission are dumped through passage 108 so that the compressor is inoperative as hereafter more fully explained.

With the operating valve 232 positioned for station idling condition of operation, passage 170 is connected to passage 172 so that oil supplied to the chamber 16 is caused to pass through the restriction 267. The passage 171 is connected directly to passage 108 so that the oil may be dumped from chamber 16 with a minimum of restriction. The air pressure supply passage 175 is connected to passage 172 through the restriction 182 to supply air under pressure to chamber 16. This quickly dumps the chamber 16 to render the left engine ineffective to transmit power through the fluid coupling unit. The valve 232 is also effective to connect passage 106 to exhaust passage 108 and to connect passage 101 to 107 to place the air compressor unit in overdrive operation. Thus, with the left engine cut out of the drive train and with the right engine idling, the air compressor is driven at a sufficient speed to provide adequate cooling capacity to maintain required temperature within the bus.

At the left hand half of the lower portion of Figure 3, there is shown an emergency valve 231 which may be positioned for normal driving, for emergency shut down of the right hand engine, or for emergency shut down of the left hand engine. In its normal driving position, the valve 231 connects the pressure supply passage 169 to passage 176 to fill the coupling chamber 39 and at the same time connects passage 177 to exhaust passage 108 through the restriction 183 to provide for continuous circulation of fluid under pressure through the chamber 39 for cooling purposes. At the same time, the valve 231 shuts off the air passage 175 from chamber 39. The passage 176 of Figure 3 is connected to passage 51 of Figure 1. Passage 177 of Figure 3 is connected to passage 55 of Figure 1.

For emergency shut down of the right hand engine, the emergency valve 231 supplies oil through the restriction 183 and through the right hand coupling oil return passage 177. The right hand coupling pressure supply passage 176 is connected directly to the sump through discharge passage 108 without restriction. Air pressure from passage 175 is admitted through the restriction 181 and passage 177 to chamber 39 to quickly force working fluid from chamber 39.

With the emergency control valve 231 positioned for emergency shut down of the left hand engine, the valve 231 supplies the right hand engine coupling with fluid pressure through the right hand coupling supply passage 176. Oil is returned from chamber 39 through passage 177 and the restriction 183 to passage 108 leading to the sump. Air pressure from passage 175 is blocked off from the right hand coupling. Oil is supplied to the left hand engine through the restriction 267 and through the left hand coupling return passage 172. Oil is returned from the left hand engine to the sump through the left hand engine supply passage 171. Air pressure is supplied to the coupling 16 through restriction 182 and passage 172.

Details of the operating valve 232 are shown in Figures 5 through 19. Details of the emergency valve 231 are shown in Figures 5 through 10 and 20 through 28.

Figure 8:
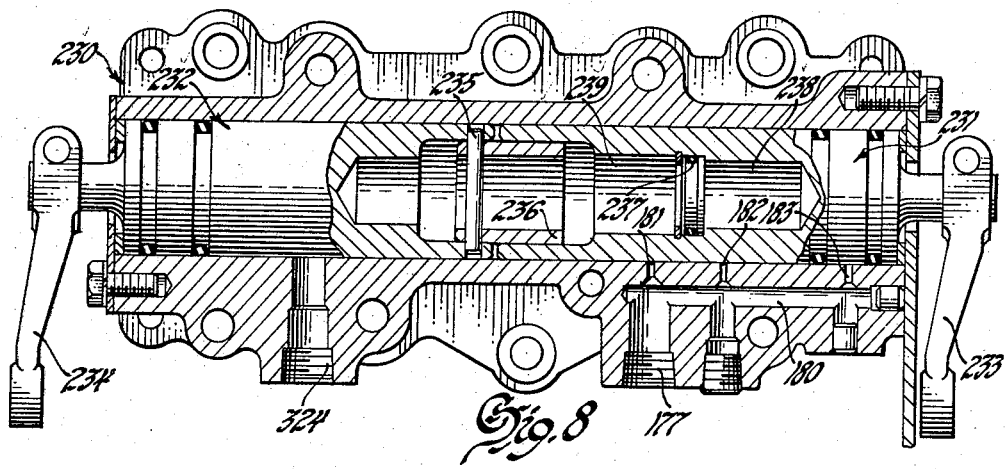
Figure 8 is a partially sectional view of the control valve housing assembly.
Figure 18:
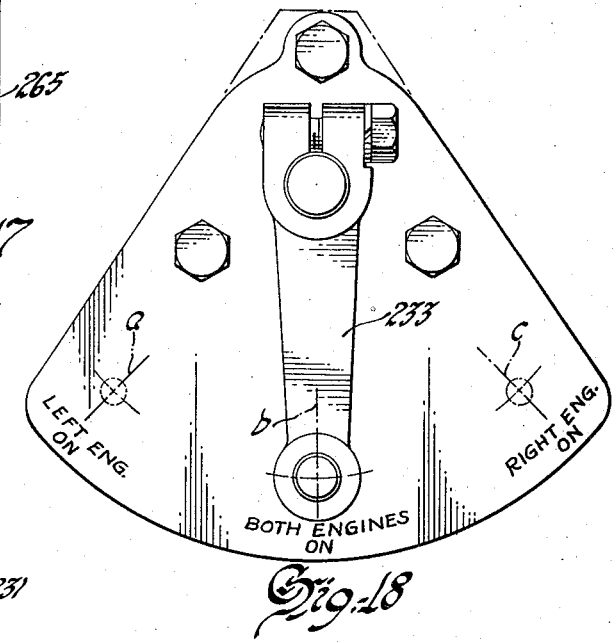
Figure 18 is an end view of the valve casing of Figure 8 showing the control handle for rotating the emergency valve in the casing.

Referring to Figure 8, there is shown a valve casing 230 having a so-called emergency valve 231 and an operating valve 232 disposed therein and adapted to be rotated in the casing to the various operating positions heretofore recited. Valve 231 may be rotated by a handle 233. The various operative positions of the handle 233 are indicated in Figure 18 wherein the handle 233 is illustrated as being positioned in its manual driving position indicated by the letter b. In this position of handle 233, both engines will normally be effectively connected to the two-speed clutch unit for driving the same. The operating valve 232 may be rotated in casing 230 by a handle 234 shown in Figures 8 and 28, the handle 234 in Figure 28 being shown in the "normal winter driving position" wherein the air conditioning compressor transmission is in neutral so that the compressor cannot be driven. Valve 232 has an extension 236 secured thereto by means of a pin 235 so as to be rotated with valve portion 232. Thus, the emergency valve 231 overlaps extension 236 of valve 232. A seal 237 carried by valve 231 separates a chamber 238 in valve 231 from a chamber 239 in valve 231. Chamber 239 extends into valve 232 as shown. Chamber 238 is a pressure chamber adapted to receive pressure to be delivered to the fluid coupling chambers 16 and 39 of Figure 3. Chamber 239 is an exhaust chamber, the chamber 239 being adapted to be connected to a dump port 240 connected to exhaust chambers 240a and 240b of Figure 7 as hereafter more fully explained.

Figure 10:
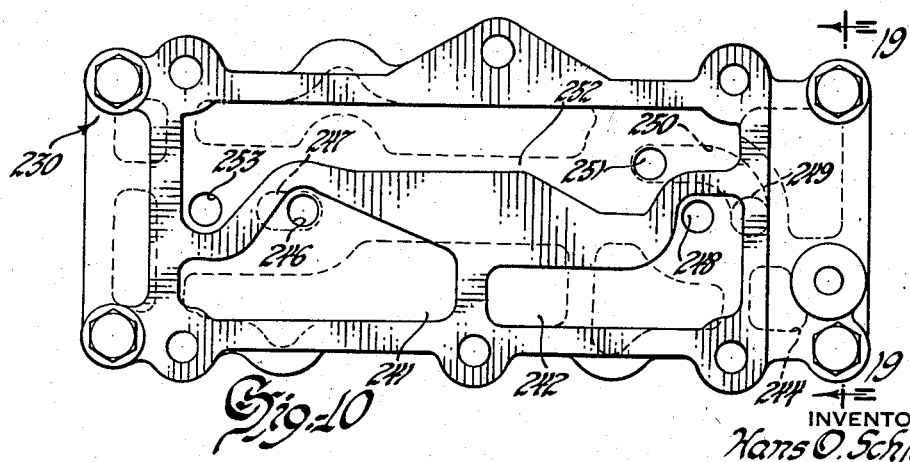
Figure 10 is a bottom plan view of the valve housing of Figure 9 with the valve housing adaptor plate removed.

Referring to Figure 10, pump discharge pressure under a predetermined pressure, for example 75 pounds per square inch, is supplied directly into a chamber 241 of casing 230 and pressure under a predetermined pressure, for example 35 pounds per square inch, is supplied directly into chamber 242. An adapter plate (not shown) may be furnished to directly mount the casing 230 on the pump (not shown) or the chambers 241 and 242 may be furnished with fluid pressure through passages 101 and 170 as shown schematically in Figure 3. Air under a predetermined pressure, for example 25 pounds per square inch, may be supplied into the casing 230 by a pipe 175 and through a restriction orifice 243 to an air chamber or passage 244 (see Figs. 10 and 19). As shown in Figure 5, the air supply to the emergency and operating valves is conducted longitudinally across the casing through a passage 245 to a chamber 244a.

Figure 22:
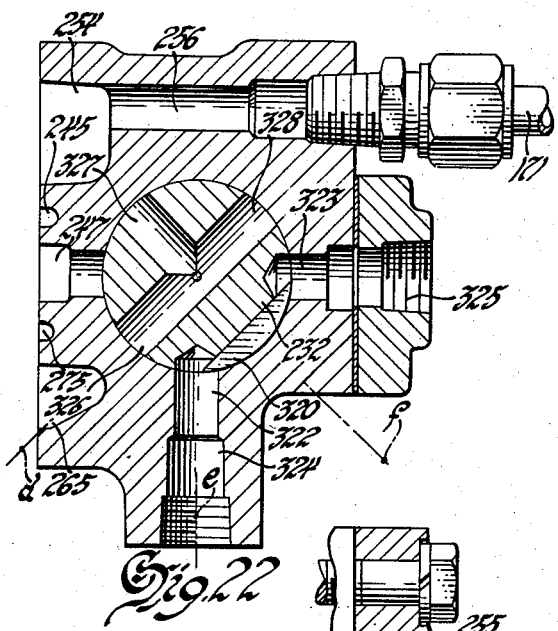
Figure 22 is a sectional view taken along the line 22—22 of Figure 7.

Referring to Figures 10, 5 and 22, the oil under 75 pounds pressure for establishing the drive ratio of the air conditioning compressor transmission 165 is conducted from chamber 241 of Figure 10 through a passage 246 to a passage 247 (see Figs. 10 and 5), the passage 247 being shown in Figure 22 as the passage whereby oil pressure is admitted to the valve 232.

Figure 14:
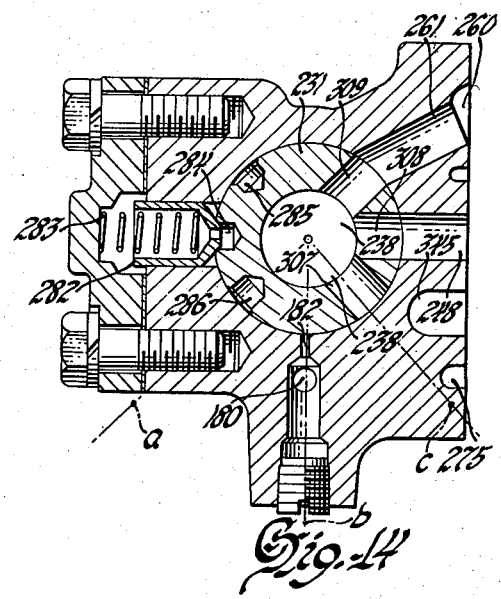
Figure 14 is a sectional view taken along the line 14—14 of Figure 7.

Referring to Figures 10, 5 and 14, oil under 35 pounds per square inch pressure (fluid coupling working fluid) is conducted from chamber 242 through a passage 248 to chamber 238 of valve 231. Chamber 238 is also shown in Figure 8. Oil pressure under control of the emergency valve 231 may be admitted from chamber 238 of valve 231 to a port 249 connected to arcuate passage 250 to supply oil to the operating valve 232 (see Figs. 5, 10, 15). Arcuate passage 250 is connected to the operating valve 232 through a port 251, a chamber 252 and a port 253 (see Figs. 5, 10, 23).

Figure 11:
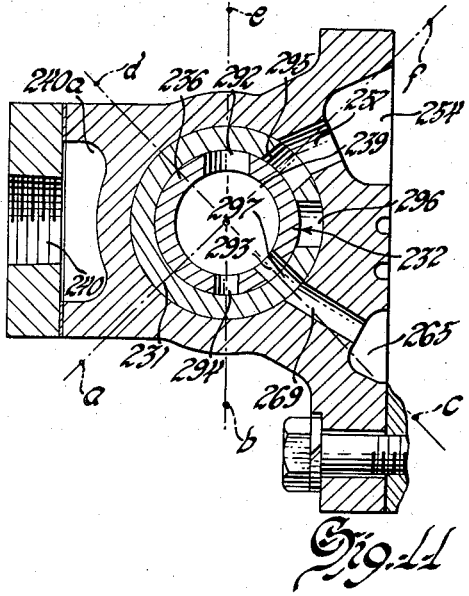
Figure 11 is a sectional view taken along the line 11—11 of Figure 7.
Figure 12:
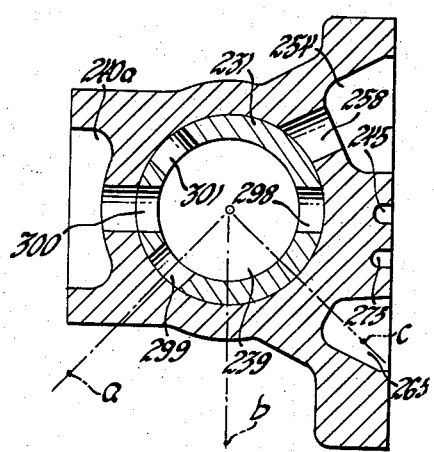
Figure 12 is a sectional view taken along the line 12—12 of Figure 7.

In Figure 5, casing 230 is shown as having a chamber 254 adapted to receive oil under 35 pounds per square inch pressure, the chamber being termed a left hand supply chamber since the chamber receives oil to be supplied to the fluid coupling chamber 16 of the left hand engine coupling. Oil may be supplied to chamber 254 under control of valve 232 through a port 255 shown in Figures 5 and 23. A passage 256 of Figures 5, 22 and 7, admits oil from chamber 254 to passage 171 of Figures 3 and 22. Ports 257 and 258 of chamber 254 are exhaust ports for chamber 254. Port 257 connects chamber 254 to the valve 231 as shown in Figure 11. Port 258 connects chamber 254 to valve 231 as shown in Figure 12.

In Figure 5, there is shown a chamber 260 adapted to receive oil under 35 pounds per square inch and termed a right hand supply chamber since it receives oil to be supplied to the fluid coupling chamber 39 (see Fig. 3) of the fluid coupling unit driven by the right hand engine. Oil may be admitted to chamber 260 under control of valve 231 through a passage 261 (see Figures 5 and 14). Chamber 260 is connected to right hand coupling pressure supply passage 176 of Figure 3 through a passage 262 shown in Figures 5, 13 and 7. Port 263 of Figures 5 and 13 connects to valve 231 so that exhaust of pressure from chamber 260 may be controlled by valve 231.

Figure 15:
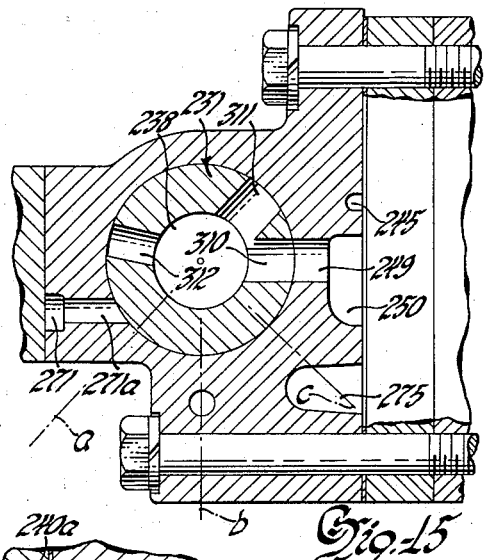
Figure 15 is a sectional view taken along the line 15—15 of Figure 7.
Figure 21:
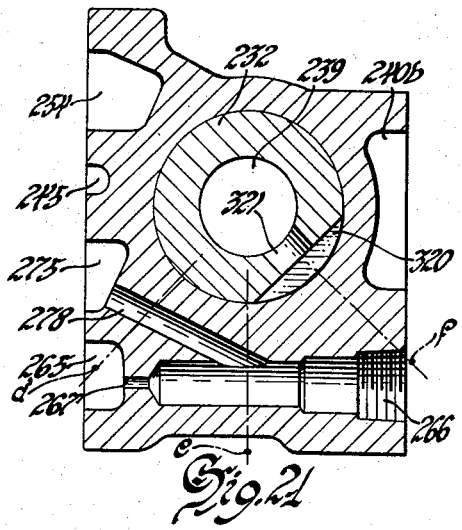
Figure 21 is a sectional view taken along the line 21—21 of Figure 7.

Referring further to Figure 5, there is shown a chamber 265 termed a left hand return passage since it is adapted to receive oil returning to valves 231 and 232 from the fluid coupling chambers 16 and 39 of Figure 3. Chamber 265 is connected to left hand oil return passage 172 of Figure 3 through a passage 266 (see Figures 5, 7 and 21). In Figures 3 and 21, the passage is shown as having a restriction 267 therein. A port 268 shown in Figures 5 and 25 connects chamber 265 to valve 232. A port 269 shown in Figures 5 and 11 connects chamber 265 to the valve 231 and extension 236 of valve 232 as shown particularly in Figure 11. Port 270 of Figure 5 connects the left hand coupling oil return passage 265 to valve 231 through a passage 270 and a port 271 as shown in Figures 17 and 15.

Figure 19:
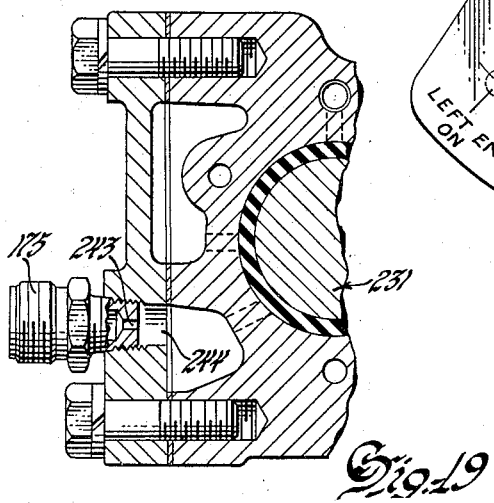
Figure 19 is a sectional view taken along the line 19—19 of Figure 10.

As heretofore stated, air under pressure is supplied to a chamber 244 shown in Figures 10, 19 and 5 through air supply passage 175 of Figures 3 and 19. As shown in Figure 5, chamber 244 is connected to an air chamber 244a by a passage 245. A port 272 shown in Figures 5 and 16 connects chamber 244 to the valve 231 as particularly shown in Figure 16. A port 273 shown in Figures 5 and 26 connects chamber 244a to the valve 232 as particularly shown in Figure 26.

Figure 16:
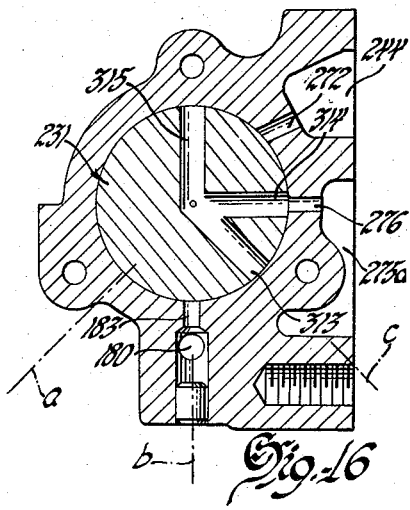
Figure 16 is a sectional view taken along the line 16—16 of Figure 7.

Referring further to Figure 5, there is shown a passage 275 which is termed an air outlet passage because it constitutes the means by which air under pressure and under control of valves 231 and 232 is conducted out of casing 230. Passage 275 connects chambers 275a and 275b of Figure 5 to each other. A port 276 connects chamber 275a to valve 231 as shown in Figure 16. A port 277 of Figure 5 connects chamber 275b to valve 232 as shown in Figure 26. A passage 278 of Figure 5 connects passage 275 to passage 266 as shown in Figure 21.

Figure 17:
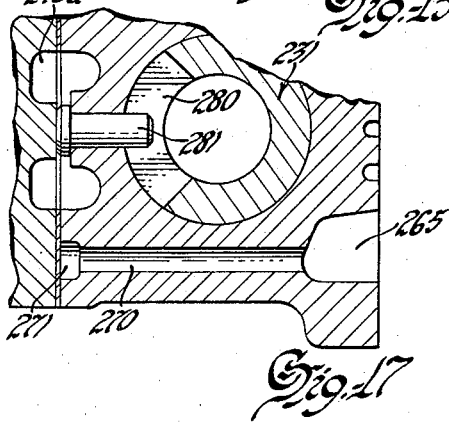
Figure 17 is a sectional view taken along the line 17—17 of Figure 7.

In Figure 17, valve member 231 is shown as having a slot 280 therein of limited extent, there being a pin 281 extending into slot 280 to limit the permissible range of rotary motion of valve 231 by handle 233. Pin 281 will strike valve member 231 at the extremities of slot 280 to prevent further movement of the valve 231 in a given direction. Pin 281 is also shown in Figure 7. In Figure 14, there is shown a detent mechanism for yieldably holding the valve member 231 in any selected position. A cam member 282 is pressed by a spring 283 to extend partially into recesses 284, 285 or 286 when such recesses are in registry with cam 282. In the position illustrated, cam 282 is in registry with recess 284 to yieldably hold the valve in its position wherein fluid is supplied to both fluid couplings to establish drive by both engines.

Figure 20:
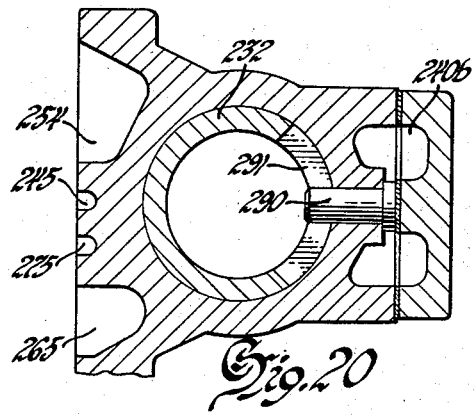
Figure 20 is a sectional view taken along the line 20—20 of Figure 7.

In Figure 20, a pin 290 extends into a slot 291 on valve member 232 to limit the permissible range of rotary motion of valve member 232. When the valve member 232 has been rotated to the limit of slot 291 in either direction, pin 290 will prevent further rotary motion of valve member 232 in that direction. Pin 290 is also shown in Figure 7.

In Figures 11 through 16, the emergency valve is illustrated in its *b* or normal driving position shown in Figure 18 wherein working fluid is to be directed to both fluid coupling chambers 16 and 39 of Figure 3 to establish drive through both fluid coupling units. The valve extension 236 of valve 232 is shown in Figures 8 and 11 in the position it occupies when the operating valve 232 is positioned to its *e* position shown in Figure 28, which position is the position of valve 232 for normal winter driving wherein the air conditioning transmission is rendered unable to drive the air compressor.

Referring to Figure 11, extension 236 of valve 232 is provided with ports 292, 293 and 294. Valve 231 is provided with ports 295, 296 and 297. With the valves positioned as shown in Figure 11, the left hand engine fluid coupling oil return chamber 265 is connected to exhaust through passage 269, port 297, port 293 and exhaust chamber 239. Left hand engine fluid coupling oil supply chamber 254 is blocked off from exhaust chamber 239 because none of the ports of valve extension 236 are in registry with passage 257 leading to chamber 254.

Referring to Figure 12, the valve 231 is shown as having ports 298, 299, 300 and 301. In the position shown, exhaust chamber 239 is connected by port 300 to exhaust chamber 240a to connect chamber 239 to exhaust. Passage 258 connecting to chamber 254 is blocked off from chamber 239.

Figure 9:
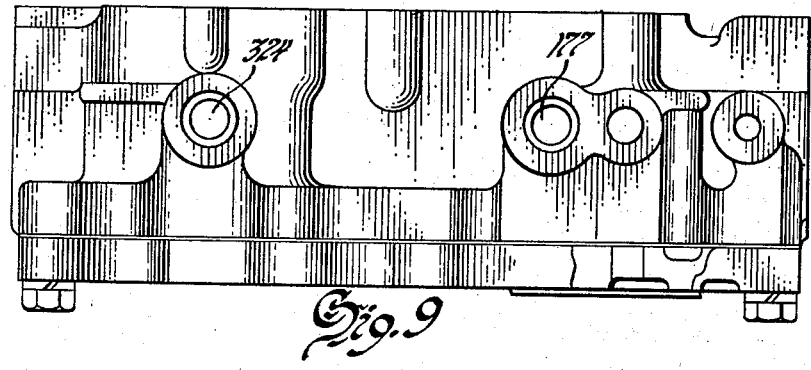
Figure 9 is a bottom plan view of the valve housing of Figure 8 with a valve housing adaptor attached to the valve housing.
Figure 13:
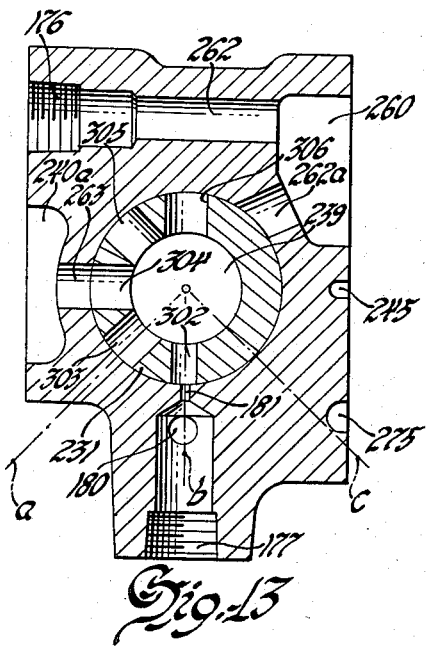
Figure 13 is a sectional view taken along the line 13—13 of Figure 7.

Referring to Figure 13, the valve member 231 is shown as provided with ports 302, 303, 304, 305 and 306. In the valve position shown, chamber 260 is blocked off from exhaust chamber 239 of valve 231. A passage 180 which may be connected to right hand coupling oil return passage 177 of Figure 3 is shown in Figures 8, 9 and 13. A restriction 181 shown in Figures 8 and 13 is imposed in passage 180 to restrict the rate of fluid flow to exhaust chamber 239 of valve 231 when port 302 is in registry with passage 180 as illustrated in Figure 13. Thus, with valve 231 positioned as illustrated in Figure 13, oil is permitted to return to the transmission sump at a restricted rate of flow. Oil being dumped from passage 180 passes through restriction 181, port 302, chamber 239 and port 304 to exhaust chamber 240a.

In Figure 14, valve 231 is provided with ports 307, 308 and 309. In the position shown, 35 pounds per square inch pump pressure from port 248 is admitted through port 308 to pressure chamber 238 of valve 231 and from chamber 238 to right hand engine fluid coupling supply chamber 260 by way of port 309 of valve 231 and passage 261. As heretofore explained, passage 262 of Figure 13 connects chamber 260 to the right hand engine fluid coupling supply passage 176 of Figure 3. Thus, unrestricted flow of oil under pressure is supplied to chamber 39 of the right hand engine fluid coupling unit, while restricted flow of oil from chamber 39 is provided. In Figure 14, a restriction 182 is placed in passage 180 as shown. This restriction 182 is also shown in Figure 8. With the valve positioned as illustrated in Figure 14, restriction 182 and passage 180 are blocked off from pressure supply chamber 238 of valve 231.

In Figure 15, valve 231 is shown as being provided with ports 310, 311 and 312. In the position shown, oil pressure from pressure supply chamber 238 is admitted to port 249 by port 310 of valve 231. As heretofore explained, port 249 admits oil to arcuate passage 250 and through port 251 to chamber 252 (see Figure 10). Passage 253 of Figures 10 and 23 admit oil to valve 232. Port 271a is blocked off by the valve 231 in the position of the valve shown in Figure 15. A passage 271 shown in Figures 15, 17 and 27 connects port 271a of Figure 15 to port 270 of Figure 17. Figure 27 shows a pad 410 to be placed on the valve housing 230 upon which is mounted the valve cover 411 of Figure 6.

As shown in Figure 16, valve 231 is provided with ports 313, 314 and 315. In the position shown in Figure 16, port 272 of air supply chamber 244 is blocked off by valve 231. Passage 276 leading to air delivery chamber 275a is connected to port 314, but no function is accomplished. Right hand fluid coupling oil return passage 180 connected to passage 177 of Figure 3 (see also Figure 8) is blocked off by valve 231. A restriction 183 is placed between passage 180 and valve 231 as shown in Figure 8.

Thus, with valve 231 positioned as illustrated in Figures 11 through 16 and 18 to cause drive through both fluid coupling units of Figure 3, the valve provides five functions. It supplies oil under 35 pounds per square inch to the right hand engine fluid coupling through right hand engine fluid coupling supply passage 176 of Figure 3. It returns oil from the right hand engine fluid coupling to sump through the right hand fluid coupling return passage 177 of Figure 3 and through the restriction 183 to limit the rate of discharge of oil from the fluid coupling unit. It shuts off air from the right hand engine oil return passage 177. It supplies oil under 35 pounds per square inch pressure to the operating valve 232. It returns oil from the left engine fluid coupling unit to the sump through left hand engine fluid coupling unit return passage 172 and through the restriction 267 in passage 266. This latter function is accomplished because valve 231 when positioned as shown in Figure 16 blocks off the air chamber 244 from 275a. Therefore all oil from passage 266 of Figure 21 is caused to pass through port 267 of Figure 21 to get into chamber 265. As heretofore stated, Figures 11 through 16 represent a single position of valve 231, that position being the position which represents normal driving wherein both fluid coupling units are supplied with oil on an unrestricted basis and wherein oil is charged from both fluid coupling units through a restriction.

The emergency valve 231 may be positioned for emergency shut down of the right hand engine in order to cut the right hand engine out of the drive train and to permit drive solely through the left hand engine. As heretofore explained, in normal operation, oil is supplied to the outer periphery of the fluid coupling chambers and is returned from the inner zone of the fluid coupling chambers through restrictions. When either engine is cut out of the drive train, a mixture of oil and air is supplied to the coupling to be cut out of the drive train through the normal oil return passage for that coupling. The normal oil supply passage becomes a dump passage for the coupling to be disabled. Thus, in normal operation, each coupling is supplied with oil under pressure without restriction, but in dumping each coupling is supplied oil through a restriction and air without restriction through the normal oil return passage. The normal oil supply passage becomes an unrestricted dump passage for return to the sump.

If we assume that the valve 231 is positioned for emergency shut down of the right hand engine, the valve will be rotated clockwise approximately 45° to the position *a* indicated on Figures 11 through 16 and 18. In this position, valve 231 serves five functions. It supplies oil to the right hand engine coupling through a restriction 183 in the right hand engine coupling oil return passage 177 of Figure 3. It returns oil from the right hand engine fluid coupling chamber 39 to the transmission sump through the normal right hand engine coupling supply passage 176 of Figure 3. It supplies air under pressure to the normal right hand coupling oil return passage 177. It supplies oil under pressure to the operating valve for the left hand engine. It returns oil from the left hand engine coupling unit to the sump through the left hand engine coupling return passage 172.

If we assume that the valve 231 is positioned for emergency shut down of the right hand engine, the valve will be in position *a*. Referring to Figure 11, the valve extension 236 of valve 232 will be in position *d* which indicates normal winter driving. With the valves thus positioned, left hand engine coupling oil return chamber 265 will be connected to exhaust chamber 239 through port 296 of valve 231 and port 294 of valve extension 236. Valve 231 blocks off the left hand coupling supply chamber 254 from chamber 239. Chamber 239 of valve 231 is connected to exhaust chamber 240a by port 299 as shown in Figure 12. Again, chamber 254 of Figure 11 is cut off from chamber 239 by valve 231. Referring to Figure 13, right hand coupling oil supply chamber 260 is connected to exhaust chamber 239 of valve 231 through ports 262a and 306. Chamber 239 is connected to exhaust chamber 240a through port 303 of valve 231. The right hand coupling oil return passage 180 is blocked off from chamber 239 by the valve 231. Referring to Figure 14, oil from the pump 166 of Figure 3 is supplied through ports 248 and 309 to pressure supply chamber 238. Oil is supplied to right hand oil return passage 180 (connected to passage 177 of Figure 3) through port 307 and restriction 182. Referring to Figure 15, oil is supplied from oil pressure supply chamber 238 to chamber 250 through ports 311 and 249. Port 271a is blocked off from chamber 238 by valve 231. Referring to Figure 16, air is supplied from air supply chamber 244 to the right hand coupling oil return passage 180 (connected to right hand coupling return passage 177 of Figure 3) by port 272, port 315, port 313 and restriction 183. Thus, air supply chamber 244 is connected to passage 177 of Figure 3 by valve 231. Port 276 leading to air outlet chamber 275a is blocked off from air supply passage 244 by valve 231. Due to this fact, all oil being returned to the sump from the left hand engine coupling oil return passage 172 is caused to pass through restriction 267 of Figure 21 before being dumped to sump by ports 296 and 293 of Figure 11. Air trapped in chamber 275 will prevent oil being dumped through passage 266 of Figure 21 even from entering air passage 278 of Figure 21. Passage 172 of Figure 3 is connected to passage 266 of Figure 21.

If we assume that valve 231 be positioned for emergency shut down of the left hand engine, the valve will be rotated counter-clockwise to the position c indicated on Figures 11 through 16 and 18. In this position valve 231 serves six functions. It supplies the right hand engine coupling with oil through the right hand coupling supply passage 176 of Figure 3. It returns oil from the right hand coupling through a restriction and through the right hand coupling return passage 177 of Figure 3. It shuts off the supply of air to the right hand engine fluid coupling unit. It supplies oil to the left hand engine coupling through a restriction and through the normal left hand coupling oil return passage 172 of Figure 3. It returns the left hand engine coupling to sump through the normal left hand coupling supply passage 171 of Figure 3. It supplies air to the normal left hand coupling oil return passage 172 of Figure 3.

With valve 231 in position c and valve 232 in position e, left hand coupling oil supply chamber 254 (see Fig. 11) will be blocked off from exhaust chamber 239 by valve extension 236 of valve 232 even though port 257 is connected to port 296. In Figure 12, chamber 254 is connected to exhaust chamber 239 by ports 258 and 298. Chamber 239 is connected to exhaust chamber 240a by port 301. In Figure 13, right hand coupling oil supply chamber 260 is blocked off from exhaust chamber 239 by valve 231. Right hand coupling oil return passage 180 (connected to right hand coupling oil return passage 177 of Figure 3) is connected to exhaust chamber 239 of valve 231 by port 303 and restriction 181. Chamber 239 is connected to exhaust chamber 240a by port 305.

In Figure 14, oil supplied by the pump is admitted to oil supply chamber 238 of valve 231 through ports 248 and 307. Chamber 238 is connected to right hand coupling oil supply chamber 260 through ports 308 and 261.

Restriction 182 of right hand coupling oil return passage 180 is blocked off by valve 231.

In Figure 15, chamber 250 is blocked off from pressure supply chamber 238 of valve 231 by the valve 232. Pressure supply chamber 238 is connected through ports 312 and 271a to a passage 271 (see Figs. 15 and 17). Passage 271 is connected to port 270 leading to left hand coupling oil return passage 265 of Figures 17 and 21. Oil is supplied through chamber 265 through a restriction 267 of Figure 21 to passage 266 connected to left hand return passage 172 of Figure 3. Thus, oil supplied to the left hand engine coupling is supplied through restriction 267.

In Figure 16, the air delivery passage 275a is connected to air supply passage 244 by ports 313 and 314 of valve 231. Air from chamber 275a and 275 is conducted to the left hand coupling oil return passage 266 by a passage 278 (see Fig. 21). Thus, air and oil are both supplied to the passage 172 of Figure 3 when the left hand engine is cut out of the drive train.

Referring now particularly to Figures 8 and 20 through 26, the details of the operating valve 232 are shown. As indicated in Figure 28, the handle 234 of valve 232 may be positioned in positions d, e or f. Position d is the position of valve 231 for normal summer driving wherein the air conditioning compressor unit transmission of Figure 4 is driven in direct drive. Position e is the position corresponding to normal winter driving wherein air conditioning compressor transmission is unable to drive the compressor unit. Position f is the position of valve 232 for station cooling wherein the air conditioning compressor transmission is driven in overdrive operation to assure adequate cooling capacity even though the engine which drives the compressor transmission may be idling. In Figures 21 through 26 and 28, valve 232 is illustrated in position e, which corresponds to normal winter driving.

Referring to Figure 21, the valve exhaust chamber 239 is shown as connected to a cut-back portion 320 by a port 321. The recess 320 is shown in Figure 22 as being in communication with a pair of ports 322 and 323. In position e illustrated, the supply passage 324, which is connected to passage 107 of Figure 3 for supplying pressure to the overdrive servo 218 of Figure 3, is connected to exhaust through port 322, recess 320 of Figure 22 and port 321, chamber 239 of Figure 21. Chamber 329 is connected to exhaust chamber 240a through ports 299, 300 or 301 of Figure 12, depending upon the rotational position of valve 231. Passage 325 of Figure 22 is connected to exhaust through port 323, recess 320, port 321 and chamber 239 (see Figs. 22 and 21). Passage 325 of Figure 22 is connected to the passage 106 of Figure 3 to deliver pressure for direct drive of the compressor transmission. Thus, in position e both passages 106 and 107 of Figure 3 are connected to exhaust and the transmission is unable to drive the compressor. In Figure 22, valve 232 is also provided with ports 326, 327 and 328. In position e fluid pressure supply port 247 (which may be connected to supply passage 101 of Figure 3) is blocked off by valve 232.

Figure 24:
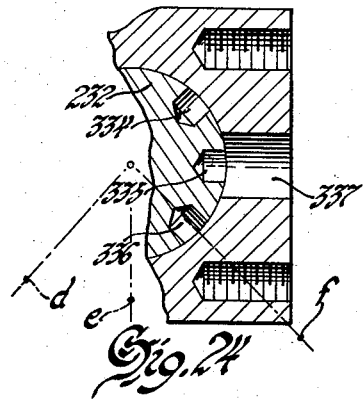
Figure 24 is a sectional view taken along the line 24—24 of Figure 7.
Figure 23:
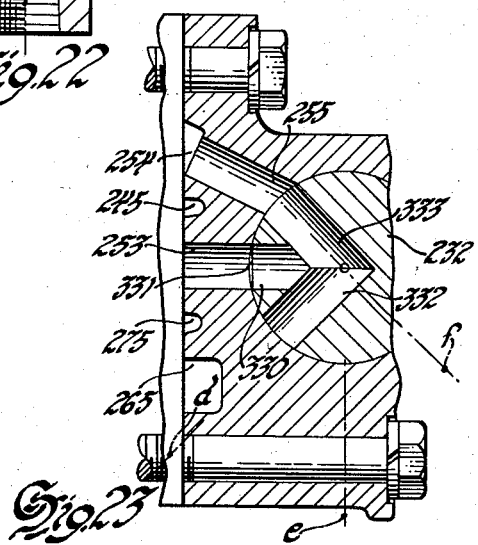
Figure 23 is a sectional view taken along the line 23—23 of Figure 7.
Figure 25:
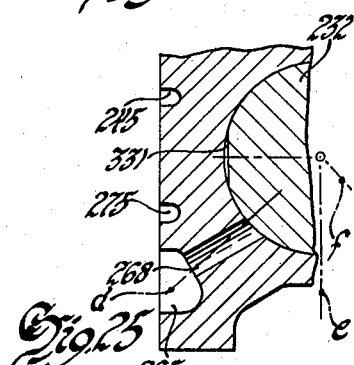
Figure 25 is a sectional view taken along the line 25—25 of Figure 7.

In Figure 23, the passage 253 supplies oil to a port 330 of valve 232. In the position shown, oil is conducted through ports 330, 333, 255 to left hand engine coupling oil supply chamber 254. This chamber is connected to left hand coupling supply passage 171 of Figure 3 through passage 256 (see Fig. 22). It will be noted that the valve 232 is recessed at port 330 as indicated at 331. Recess 331 is also shown in Figure 25. Valve 232 in Figure 24 is shown as having drilled openings 334, 335 and 336 adapted to cooperate with a spring pressed detent mechanism (not shown) corresponding to the detent mechanism of Figure 14. An opening 337 is drilled in the casing to receive the detent mechanism (not shown). The detent mechanism is for the purpose of yieldably holding valve 232 in any selected position.

In Figure 26, valve 232 is shown as having a recess 338 thereon. In the position shown in Figure 26, valve 232 blocks off the air supply chamber 244a from air delivery chamber 275b.

In Figure 25, valve 232 is shown as having a recess 331 thereon. In position e, valve 232 blocks off the port 268 leading to left hand coupling oil return chamber 265. Thus, in position e illustrated, valve 232 supplies oil to the left hand engine coupling through the supply passage 171. By blocking off air chamber 244a from air chamber 275b, oil returning through passage 266 (see Fig. 21) which is connected to passage 172 of Figure 3 is prevented from entering passage 278 and is caused to pass through restriction 267 of Figure 21. The valve shuts off air supply chamber 244a from air delivery chamber 275b. In addition, valve 232 dumps both passages 106 and 107 of Figure 3 to exhaust so that the air compressor transmission is unable to drive the air compressor.

If valve 232 is rotated approximately 45 degrees clockwise from position e, it will be placed in position d for normal summer driving. In this position, valve 232 supplies oil under pressure to the left hand engine coupling through supply passage 171 of Figure 3. In Figure 23, oil from pressure supply port 253 is connected to left hand engine coupling supply chamber 254 through ports 332, 330 and 255. In Figure 22, chamber 254 is shown connected to passage 171 of Figure 3 by passage 256. Because of the fact that air supply chamber 244a is blocked off from air chamber 275b (see Fig. 26) oil returning from the left hand return passage 172 of Figure 3 through passage 266 of Figure 21 is caused to pass through orifice 267. Chamber 265 of Figure 21 and Figure 11 is dumped through port 297 of valve 231 and port 294 of valve extension 236 of valve 232 to exhaust chamber 239 (see Fig. 11).

Air supply chamber 244a of Figure 26 is blocked off from air delivery chamber 275b. In Figure 22 oil from pressure supply passage 247 is supplied to passage 325 (which may be connected to passage 106 of Figure 3) to establish direct drive of the air conditioning compressor unit. Passage 324 (which is connected to passage 107 of Fig. 3) is exhausted to the sump through ports 320 of Figure 22, port 321 and chamber 239 of Figure 21 and through port 300 of Figure 12. If valve 231 is in position a in Figure 12, the exhaust port for chamber 239 will be port 299, but if valve 231 is in position c in Figure 12, the exhaust port for chamber 239 will be port 301. Thus, the air conditioning compressor transmission is driven in direct drive.

With the valve 232 positioned for position f which represents the "station cooling" position of valve 232, five functions are provided by the valve. Oil under pressure is supplied to the left hand engine coupling unit from pressure supply passage 253, port 333, port 330, recess 331 and port 268 to chamber 265 (see Figs. 23 and 25). As shown in Figure 21, chamber 265 is connected to passage 266 through orifice 267. Passage 266 is connected to passage 172 of Figure 3. Oil is returned from the left hand engine fluid coupling to the sump through the normal left hand coupling supply passage 171 of Figure 3. Passage 171 is connected to chamber 254 by passage 256 of Figure 22. With valve 232 positioned in its f position, and with valve 231 positioned in its normal driving position (position b), chamber 254 is connected to exhaust chamber 239 through passage 257, port 295 of valve 231, and port 292 of valve extension 236 (see Fig. 11). If valve 231 is positioned for emergency shut down of the left hand engine (position c) as would be normal for station cooling operation, chamber 254 is exhausted through port 257, port 296 of valve 231, port 292 of valve extension 236 of valve 232 to chamber 239. Chamber 239 is exhausted to chamber 240a through port 300 if valve 232 is in its b or normal driving position, and is exhausted to chamber 240a through port 301 of valve 231 when valve 231 is positioned in position c for emergency shut down of the left hand engine (see Fig. 12). Valve 231 supplies air under pressure to the left hand coupling oil return passage 172 of Figure 3. With valve 232 positioned in its f position, air from air supply chamber 244a is admitted to air delivery chamber 275b by port 273, flat recess 338 on valve 232 and port 277 (see Fig. 26). As shown in Figure 21, chamber 275 is connected to passage 266 through passage 278. Thus, valve 232 delivers air to passage 266 which is connected to passage 172 of Figure 3. Oil from direct drive air conditioning transmission supply passage 106 of Figure 3 is exhausted through port 325 of Figure 22, flat recess 320 of valve 232 and port 321 of Figure 21 to chamber 239 of valve 232 (see Figs. 22 and 21). Exhaust chamber 240a of Figure 12 is connected to chamber 239 through ports 299, 300 or 301, depending upon the position of valve 231. In its f position, valve 232 directs pressure into the passage 107 of Figure 3 to establish overdrive operation of the compressor transmission. As shown in Figure 22, oil from pressure supply passage 247 is conducted through ports 327 and 326 of valve 232 to passage 324 when valve 232 is in its f or station cooling position. Passage 324 of Figure 22 is connected to passage 107 of Figure 3.

With the foregoing explanation, it will be understood how the various functions of the valve mechanism illustrated schematically in Figure 3 are accomplished.

Referring now to Figure 29, there is shown a schematic diagram of the dual engine, plural speed clutch and transmission assembly. The cam member 156 of Figure 2 may be operated by a clutch pedal 155 through a cable 157 connected to clutch pedal 155 by a bell crank lever 158 and connected to cam member 156 by a bell crank lever 159. When the clutch is depressed by the vehicle operator, cam 156 acts upon one of the pins 142 or 143 of Figure 2 to establish neutral or no-drive operation of the two-speed clutch unit 62 to permit manual shift of the manually shiftable gear box 160. The air conditioning compressor transmission unit 165 is driven from the right engine of the assembly through shaft 161, pulleys 163 and 163a and belt 162 to shaft 164. As heretofore explained, the air compressor may be driven in direct drive, overdrive, or may be conditioned for neutral or no-drive operation.

In Figure 29, there is illustrated a shift lever 340 by which shift of the transmission unit 160 may be accomplished. Carried by shift lever 340 is a switch 341 by which the vehicle operator may select either direct or overdrive operation of the two-speed clutch unit 62. When selector switch 341 is closed, solenoid coil 114 is energized by a battery 347 to connect passage 104 to passage 105 thereby establishing overdrive operation as heretofore explained. When the switch 341 is opened as illustrated, solenoid coil 114 is de-energized and passage 105 is connected to exhaust passage 111 to establish direct drive operation as heretofore explained. In parallel with the electric circuit for switch 341 there is shown a switch 342 which is controlled by the third gear shift rail 343 of the manually shiftable transmission unit. When shift rail 343 is positioned to select third gear (high) the rail 343 will close switch 342. A raised cam or boss 344 may be provided on shift rail 343 to strike the switch when the rail 343 is positioned for third gear operation. Switch 343 together with switch 341 may control engine driven governors 345 and 346 on the right and left hand engines to reset the governors to a lower permissible engine revolutions per minute setting than that which otherwise obtains. For example, in any gear ratio other than third speed overdrive, the governors may be set to limit the engine revolutions per minute to approximately 2200 r.p.m.

In third speed overdrive, the governors are energized by battery 347 and are thereby re-set to limit engine r.p.m. to a lower value, for example 1885 revolutions per minute. It is desirable to permit a higher engine r.p.m. in the lower drive ratios up through third speed direct drive, in order to assure maximum vehicle acceleration and performance. In third speed overdrive operation, it is desirable to limit the permissible engine r.p.m. to prevent over-speeding of the vehicle. For example, in third speed overdrive operation, it is desirable to limit the maximum vehicle speed to 60 miles per hour. The governors may be controlled by a solenoid valve (not shown) effective to re-set the governor springs (not shown) to vary the governor setting. This may be done electrically or pneumatically as desired. Governors of the type to be used are well known in the art and do not constitute this invention apart from the control circuit which controls the governors.

Figure 30:
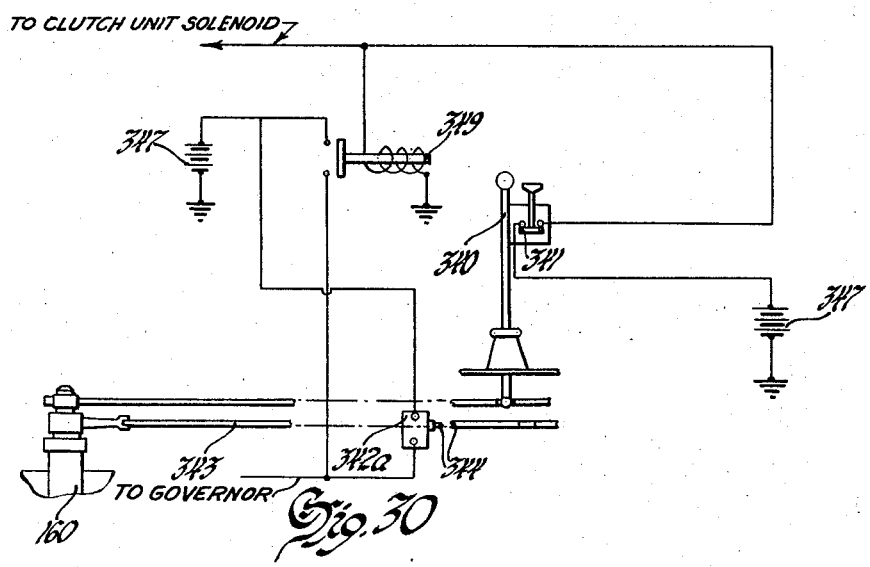
Figure 30 is a schematic diagram of an alternate arrangement of the control system for the two-speed clutch unit together with engine governor control mechanism.

In Figure 30 there is shown an alternate arrangement for controlling the setting of the engine governors. In this arrangement the governors 345 and 346 of Figure 29 would be set to permit an engine r.p.m. of greater value when the governor solenoids are energized than that permissible when the governor solenoids are de-energized. For example, if the governor solenoids 345 and 346 of Figure 29 are de-energized, the maximum engine r.p.m. might be 1850 r.p.m. When the solenoids are energized, the maximum engine speed might be 2250 r.p.m. With the transmission unit 160 in third gear, the third gear shift rail permits switch 342a to open to cut down the permissible engine r.p.m. whether the switch 341 is closed for overdrive operation or not. Thus, maximum engine r.p.m. in third gear direct drive is limited to 1885 r.p.m. If the switch 341 is closed to establish overdrive operation of the two-speed clutch unit, a relay 349 is opened to prevent engine speeds in excess of 1850 r.p.m. irrespective of the drive ratio of the manually shiftable gear box. Thus, with this alternate arrangement, the governor solenoids will be de-energized in third speed overdrive and switch 342a will be open in third speed. This will de-energize the governor solenoids in third speed overdrive to cause the governors to be set for 1850 r.p.m. In third gear direct drive, relay 349 will be closed to energize the governor solenoids to set the governors for 2250 maximum permissible engine r.p.m. In other gear ratios than third speed, switch 342a will be closed to energize the solenoids. Thus, in third speed overdrive, relay 349 and switch 342a will both be open to de-energize the governor solenoids to limit the engine r.p.m. to 1850. In all other speeds, either switch 342a or relay 349 will be closed to energize the engine governor solenoids to permit an engine speed of 2250 r.p.m.

In Figure 31 there is shown a schematic arrangement of an interlock between the control mechanism for controlling the operating valve 232 of Figure 3 and the vehicle brake pedal, together with safety mechanism for preventing excess speed of the engine which drives the compressor unit during station cooling operation. The positions illustrated are positions d, e and f which are normal summer driving, normal winter driving, and station cooling, respectively. These positions represent direct drive of the compressor transmission, no drive through the compressor transmission and overdrive operation of the compressor transmission, respectively.

In Figure 31, there is shown a control handle 350 which may be situated in the driver's compartment of the vehicle and pivoted upon a bracket 351. A battery 352 may supply current through a switch 353 to an engine control mechanism 354 which is de-energized to stop the right hand engine. The battery 352 may also supply current through a switch 355 to a mechanism 356 which is de-energized to stop the left hand engine. If switch 353 is open, both the right hand and left hand engines will be de-energized so that both engines will be stopped. The switch 355 is controlled by the lever 350 so that it will be closed when the lever is positioned in its position d, indicated, and it will be opened whenever the lever is positioned in either position e or f to stop the left hand engine only. With the lever 350 in its position d as illustrated and with the switch 353 closed, both the right hand and left hand engines will be operating and the lever 234 which controls the valve 232 heretofore described, is positioned by a cable 357 in the position d for normal summer driving. In this condition of operation the valve 232 directs pressure to passage 106 and connects passage 107 to exhaust as heretofore explained. The air conditioning compressor transmission is therefore driven in direct drive. It will be noted that there is provided a safety interlock between the vehicle brake pedal 362 and the lever 350 to prevent movement of the lever 350 accidentally or at any time when the vehicle is in motion at excessive speeds. It will readily be understood that should the compressor transmission be shifted from direct to overdrive operation at high vehicle speeds, the speed of rotation of the air conditioning compressor might be such as to damage the compressor unit. A lever 358 pivoted at 359 is provided with three recesses or pockets 360 adapted to receive the bottom end 361 of the lever 350. The lever 358 is pivoted for rotation about the point 359 and the end 359a of lever 358 is connected to the vehicle brake pedal 362 by means of a cable 363. When the brake pedal is released, the cable 363 causes rotation of lever 358 about pivot point 359 to engage the bottom end 361 of lever 350 in one of the grooves 360 thereby preventing movement of lever 350. In order to change the drive ratio of the compressor transmission, it is necessary to first depress the brake pedal 362 to cause rotation of lever 358 away from the bottom 361 of lever 350. With the brake pedal fully depressed, the lever 350 is released so that it may be moved to any desired position. Unless the brake pedal is fully depressed, the lever 350 is locked in any selected position. By this means accidental shift of the lever 350 is prevented at excess vehicle speeds.

In Figure 32, there is shown an alternate arrangement of a safety interlock between the brake pedal and the control lever 350 to prevent movement of control lever 350 accidentally or at any time when the vehicle is in motion at excessive speed. The safety lock lever 358 and control mechanism is the same as illustrated in Figure 31 except that the lever 358 is controlled by a piston 364a in a cylinder 364b, the piston being connected to lever 358 at 364 by a piston rod 364c. A spring 364e yieldably urges member 358 into contact with control lever 350 whenever passage 364d is connected to exhaust. A value 364f controlled by brake pedal 362 connects passage 364d to exhaust whenever the brake pedal 362 is released and connects passage 364d to a source of air under pressure when the brake pedal is fully depressed. A passage 364g may connect to a source of air under pressure (not shown). Thus, when the vehicle brake pedal 362 is fully depressed, lever 350 may be moved to change the drive ratio of the compressor transmission. When brake pedal 362 is released, lever 350 is locked in any selected position.

As heretofore explained, when the valve control lever 234 is positioned in its e position, which corresponds to normal winter driving, the passages 106 and 107 are both connected to exhaust so that the air compressor cannot be driven through its transmission. In the f position of lever 350, which corresponds to station cooling operation, the lever 234 is moved to its f position to cause the valve 232 to direct pressure to passage 107 and to connect passage 106 to exhaust. This establishes overdrive operation of the compressor through its transmission to assure adequate cooling capacity even though the engine may be idling.

In Figure 31, there is shown a safety device for preventing engine speed-up above a predetermined speed, for example 525 r.p.m. during station cooling operation. In the passage 107 there is provided a cylinder 364 having a piston 365 urged by a spring 366 to release a cam mechanism 368 from a governor control lever 369. Whenever fluid pressure is admitted to passage 107 to establish overdrive operation of the air conditioning compressor unit, pressure in passage 107 acting on piston 365 compresses spring 366 to force a piston rod 367 and cam 368 into contact with governor lever 369. The vehicle accelerator pedal 370 is pivoted at 371 to operate a control rod 373 by bell crank lever 372. The rod 373 is attached to a bell crank lever 374 pivoted at 375 to operate levers 376 and 382. Lever 376 is connected to bell crank lever 378 pivoted at 379 to operate governor actuating lever 380. A spring 381 in lever 380 may provide lost motion if the governor is held against rotation by the cam 368. Lever 374 is also connected to a lever 382 attached to a bell crank 383 pivoted for rotation about point 384. Bell crank lever 383 is attached to a rod 385 for actuating the lever 369 of the right hand engine. Lever 369 is pivoted for rotation about point 377 to limit engine speed. A spring 386 provides lost motion when the lever 369 of the governor is held against rotation by cam 368. Thus, if the control lever 350 is positioned for station cooling operation, cam 368 will hold the governor lever 369 in a fixed position which may correspond to 525 engine r.p.m. In case the engine accelerator pedal should accidentally be depressed in this condition of operation, the spring 386 acts as a lost motion connection permitting depression of the accelerator pedal 370, but at the same time permitting the cam 368 to hold the cam 369 of the governor in its fixed position. Thus, accidental speed-up of the compressor unit in overdrive operation is prevented.

In Figure 33, there is shown a cylinder 390 having a shuttle valve 391 disposed therein, the function of which is to prevent any possibility of the air conditioning compressor transmission unit being driven in two drive ratios at the same time. The passage 107 which conducts fluid pressure to transmission unit 165 for establishing overdrive of the compressor is connected to cylinder 390 at 392. Passage 107a connects cylinder 390 to cylinder 364. Passage 107b connects cylinder 364 to the overdrive servo of the transmission 165. Passage 106 connects to cylinder 390 at port 394. Passage 106a connects to cylinder 390 at port 395 and connects to the direct drive servo of the transmission unit 165. A pair of centering springs 396 and 397 serve to center the piston 391 between ports 392 and 394 when the valve 232 is positioned for winter driving so that both passages 107b and 106a are connected to exhaust through valve 232.

When valve 232 is positioned for normal summer driving, oil pressure is admitted through passage 106—106a to the direct drive servo of the transmission. At the same time, passages 107b—107a—107 are connected to exhaust through valve 232. It will readily be understood that with the valve 391 initially positioned intermediate ports 392 and 394, oil in chamber 399 will move piston 391 against spring 397 to block off port 392. When valve 232 is moved to its overdrive position, passage 106 will be connected to exhaust and oil will be admitted to passage 107. With port 392 blocked off, no pressure will be admitted to passage 107a. When chamber 399 is exhausted, spring 397 will move piston 391 to admit pressure to passage 107a through chamber 398. Thus, there is no possibility that the transmission unit 165 may be driven in direct and overdrive at the same time.

Conversely, in the event that the transmission is being driven in overdrive as illustrated in Figure 33, passage 106 will be blocked off from passage 106a. If valve 232 is moved to establish direct drive through the transmission 165, no oil can be admitted to passage 106a until chamber 398 is completely exhausted. When chamber 398 is exhausted, spring 396 will move shuttle valve 391 to admit pressure from passage 106 to passage 106a to establish direct drive. The shuttle valve 391 therefore constitutes a safety valve for preventing simultaneous drive of transmission 165 in direct and overdrive whether shift is from direct drive to overdrive or from overdrive to direct drive.

In Figure 34, a pair of timing valves 400 and 401 are shown in passages 107b and 106 for preventing simultaneous drive of the compressor transmission in direct and overdrive. Each of the valves 400 and 401 are the same in structure, and accordingly the details of only one of the valves is shown in Figure 35.

Valve 400 comprises a piston having a restriction 402 therein, the valve 400 having piston skirts 403 thereon with a plurality of recesses 404 in the skirt as shown in Figure 35. Valve 400 is placed in a cylinder 405 for sliding motion therein. An O ring seal 406 is placed between valve 400 and one end of cylinder 405. A similar valve 401 is placed in a cylinder 407 in passage 106, there being a similar O ring seal 406 between valve 401 and one end of cylinder 407.

The valves 400 and 401 are arranged to restrict the rate of flow of oil into the transmission servos (not shown), but to permit unrestricted exhaust of pressure from the servos. For example, if fluid pressure is admitted to passage 107b to establish overdrive operation and passage 106 is connected to exhaust, valve 400 of cylinder 405 will be pressed against O-ring 406 to cut off oil flow through the recesses 404 in skirt 403.

Oil flow into the transmission servo (not shown) for establishing overdrive operation can only be through restriction 402. At the same time, oil flowing outwardly through cylinder 407 acts to move piston 401 away from oil seal 406 so that oil may be dumped through recesses 404 in piston skirt 403. This provides a relatively slow rate of application of the overdrive band 217 of Figure 4 and a relatively fast dump of pressure from the clutch chamber 212 of Figure 4.

Conversely, in the event that a shift from overdrive to direct drive is made, a relatively fast dump through passage 107b will be achieved, while at the same time a relatively slow application of pressure to chamber 212 of Figure 4 will obtain. This latter embodiment provides for smooth shift of drive ratio and permits torque reactions which might occur should both the band 217 of Figure 4 and the clutch plates 206 and 208 of Figure 4 be applied at the same time. With this arrangement there may be a transition period in which the band 217 of Figure 4 and clutch plates 206 and 208 of Figure 4 are partially applied (with slipping action) to assure smooth pick-up and dropping of the load by the band and clutches for smooth shift of drive ratio in transmission unit 165.

The preceding description recites the objects, advantages and useful results of this invention which incorporates a number of novel features in combination, which are subject to change in specific arrangement and form of structure without departing from the spirit and scope of the invention defined in the following claims.

In the claims:

1. In combination in a dual engine power train, a first power input shaft, a first power output shaft, hydraulic torque transfer mechanism for operatively connecting said shafts, a second power input shaft, a second power output shaft, hydraulic torque transfer mechanism for operatively connecting said second power output shaft to said second power input shaft, torque transfer means operatively connecting said power output shafts to each other, a third power delivery shaft, means for connecting said third power delivery shaft to said second power output shaft including a rotatable clutch drum driven by said second power output shaft, a pair of clutches and a gear unit disposed in said clutch drum, one of said clutches being effective upon engagement thereof to drive said third power delivery shaft at the speed of rotation of said second power output shaft, the other of said clutches being effective upon engagement thereof to connect said third power delivery shaft to said second power output shaft for overdrive operation of said third power delivery shaft by said gear unit, and control means for selectively engaging said clutches and for selectively establishing simultaneous release of both of said clutches.

2. In combination in a dual engine power train, a power input shaft driven by one engine, a power output shaft, hydraulic torque transfer mechanism operatively connecting said power input and power output shafts, a second power input shaft driven by a second engine, a second power output shaft, hydraulic torque transfer mechanism for operatively connecting said second power input shaft to said second power output shaft, torque transfer means operatively connecting said power output shafts to each other, a third power delivery shaft coaxial with said second power output shaft, means for connecting said third power delivery shaft to said second power output shaft including a clutch drum driven by said second power delivery shaft, a first clutch disposed within said clutch drum and adapted to connect said third power delivery shaft directly to said clutch drum, a gear unit disposed in said clutch drum, a second clutch disposed in said clutch drum selectively operable to connect said third power delivery shaft to said clutch drum through said gear unit, and control means for selectively controlling the engagement and release of said clutches.

3. In combination in a dual engine power train, a power input shaft driven by one engine, a power output shaft, hydraulic torque transfer mechanism operatively connecting said power input and said power output shafts, a second power input shaft driven by a second engine, a second power output shaft, hydraulic torque transfer mechanism operatively connecting said second power input shaft to said second power output shaft, torque transfer means operatively connecting said first power output shaft to said second power output shaft, and a plural speed clutch unit driven by one of said power output shafts, said plural speed clutch unit including a rotatable clutch drum driven by said second power output shaft, a pair of clutches and a gear unit disposed within said clutch drum, a third power delivery shaft extending into said clutch drum, said clutch unit being operable to selectively provide neutral or drive of said third power delivery shaft through a selected one of a plurality of drive ratios.

4. In combination in a dual engine power train, a first power input shaft driven by one engine, a first power delivery shaft, hydraulic torque transfer mechanism operatively connecting said shafts, a second power input shaft driven by a second engine, a second power delivery shaft, hydraulic torque transfer mechanism operatively connecting said second power input shaft to said second power delivery shaft, torque transfer mechanism operatively connecting said power delivery shafts to each other, a multiple speed clutch unit including a rotatable clutch drum driven by one of said power delivery shafts, said clutch unit including a planetary gearing unit and a pair of selectively operable clutches disposed within said clutch drum selectively operable to provide neutral or one of a plurality of drive ratios in said planetary gearing unit, and a transmission unit driven by said multiple speed clutch unit.

5. In combination in a dual engine power train, a first power input shaft driven by one engine, a first power delivery shaft, hydraulic torque transfer mechanism operatively connecting said shafts, a second power input shaft driven by a second engine, a second power delivery shaft, hydraulic torque transfer mechanism operatively connecting said second power input shaft to said second power delivery shaft, torque transfer means operatively connecting said power delivery shafts to each other, and two-speed clutch unit including a rotatable clutch drum driven by one of said power delivery shafts, said clutch unit including a pair of clutches and a planetary gearing unit disposed in said clutch drum, said clutches being selectively operable to provide neutral, direct drive or overdrive operation of an additional power delivery shaft.

6. In combination in a dual engine power train, a first power input shaft driven by one engine, a first power delivery shaft, hydraulic torque transfer mechanism operatively connecting said shafts, a second power input shaft driven by a second engine, a second power delivery shaft, hydraulic torque transfer mechanism operatively connecting said second power input shaft to said second power delivery shaft, torque transfer means operatively connecting said power delivery shafts to each other, a two-speed clutch unit including a rotatable clutch drum driven by one of said power delivery shafts, a pair of clutches and a planetary gearing unit disposed in said clutch drum, said clutch unit being selectively operable to provide neutral, direct drive or overdrive operation of a third power delivery shaft, and a gear box driven by said third power delivery shaft, said gear box being shiftable to select any one of a plurality of drive ratios when said two-speed clutch unit is conditioned for neutral operation.

7. In combination in a dual engine power train, a power input shaft, a power delivery shaft, hydraulic torque transfer mechanism for operatively connecting said shafts, a second power input shaft, a second power delivery shaft, hydraulic torque transfer mechanism for operatively connecting said second power input shaft to said second power delivery shaft, torque transfer means connecting said power delivery shafts to each other, a fluid pressure source, and valve means for controlling the admission of fluid pressure from said source to said hydraulic torque transfer mechanisms to selectively render said hydraulic torque transfer mechanisms incapable of transmitting torque.

8. In combination in a dual engine power train, a power input shaft, a power delivery shaft, hydraulic torque transfer mechanism for operatively connecting said shafts, a second power input shaft, a second power delivery shaft, hydraulic torque transfer mechanism for operatively connecting said second power input shaft to said second power delivery shaft, torque transfer means connecting said power delivery shafts to each other, a fluid pressure source, a source of air under pressure, and valve means for controlling the admission of fluid and air to said hydraulic torque transfer mechanisms, said valve means being effective in one position to direct fluid to both of said hydraulic torque transfer mechanisms for establishing drive there through, said valve being effective in a second position to direct fluid to one of said hydraulic torque transfer mechanisms and to simultaneously direct a mixture of air and fluid to a second of said torque transfer mechanisms, said valve means being effective in a third position to direct fluid to said second torque transfer mechanism and to simultaneously direct a mixture of air and fluid to said one torque transfer mechanism.

9. In combination in a dual engine power train, a power input shaft, a power delivery shaft, hydraulic torque transfer mechanism for operatively connecting said shafts, a second power input shaft, a second power delivery shaft, hydraulic torque transfer mechanism for operatively connecting said shafts, a second power input shaft, a second power delivery shaft, hydraulic torque transfer mechanism for operatively connecting said second power input shaft to said second power delivery shaft, torque transfer means connecting said power delivery shafts to each other, a fluid pressure source, a source of air under pressure, valve means for controlling the admission of fluid and air under pressure to said torque transfer means, said valve means being effective in one position to direct fluid to the outer peripheral zone of each of said hydraulic torque transfer mechanisms and to simultaneously connect the inner peripheral zone of each of said hydraulic torque transfer mechanisms to exhaust, said valve means being effective in a second position to connect the inner peripheral zone of one of said hydraulic torque transfer mechanisms to said fluid pressure source and to said source of air under pressure and to connect the outer peripheral zone to exhaust and to simultaneously connect the outer peripheral zone of the other of said hydraulic torque transfer mechanisms to said fluid pressure source and to connect the inner peripheral zone of said other hydraulic torque transfer mechanism to exhaust.

10. In combination, a power input shaft, a power output shaft, a fluid coupling unit for operatively connecting said shafts, a fluid pressure source, a source of air under pressure, valve means for controlling said fluid coupling unit, a first unrestricted passage connecting said valve means to the outer peripheral zone of said fluid coupling unit, a second passage connecting said valve means to the inner peripheral zone of said fluid coupling unit, a restriction in said second passage, said valve means being effective in one position to connect said first passage to said fluid pressure source and to connect said second passage to exhaust, said valve means being effective in a second position to connect said first passage to exhaust and to connect said second passage to said fluid pressure source and to said source of air under pressure.

11. In combination in a dual engine power train, a power input shaft driven by one engine, a power output shaft, a fluid coupling unit for operatively connecting said shafts, a second power input shaft driven by a second engine, a second power output shaft, a fluid coupling unit for operatively connecting said second power input shaft to said second power output shaft, torque transfer means connecting said power output shafts to each other, a pump driven by one of said power output shafts, a source of air under pressure, valve means for controlling said fluid coupling units, said valve means being effective in one position to connect both of said fluid coupling units to said pump and to simultaneously connect both of said fluid coupling units to exhaust through a restriction, said valve means being effective in a second position to connect one of said fluid coupling units to said source of air under pressure and to said pump and to simultaneously connect said one fluid coupling unit to exhaust.

12. In combination in a dual engine power train, a power input shaft driven by one engine, a power output shaft, a fluid coupling unit for operatively connecting said shafts, a second power input shaft driven by a second engine, a second power output shaft, a fluid coupling unit for operatively connecting said second power input shaft to said second power output shaft, torque transfer means operatively connecting said power output shafts to each other, an auxiliary plural speed transmission unit driven by one of said engines, a fluid pressure source, a source of air under pressure, valve means for controlling drive through said fluid coupling units and drive through said auxiliary transmission, said valve means being effective in one position to connect both of said fluid coupling units to said fluid pressure source for establishing drive therethrough and to simultaneously connect said auxiliary transmission unit to said fluid pressure source to establish drive through said auxiliary transmission in a predetermined drive ratio, said valve means being effective in a second position to direct air to one of said coupling units to render said coupling unit ineffective to transmit torque and to direct fluid pressure to said other coupling unit, said valve means also being effective in said second position to direct fluid under pressure to said auxiliary transmission unit to establish a different predetermined drive ratio in said auxiliary transmission unit.

13. In combination in a dual engine power train, a power input shaft driven by one engine, a power output shaft, a fluid coupling unit for operatively connecting and disconnecting said shafts, a second power input shaft driven by a second engine, a second power output shaft, a second fluid coupling unit for operatively connecting said second power input and second power output shaft, torque transfer means operatively connecting said power output shafts to each other, a pump driven by one of said power output shafts, a source of air under pressure, a plural speed auxiliary transmission driven by one of said engines, and control valve means for controlling drive through said fluid coupling units and said auxiliary transmission unit, said control valve means being effective in one position to deliver oil from said pump to both of said fluid coupling units to establish drive of both of said power output shafts and to deliver oil from said pump to said auxiliary transmission unit to establish direct drive through said auxiliary transmission, said valve means being effective in a second position to deliver oil to one of said fluid coupling units to establish drive through said fluid coupling unit and to simultaneously deliver a mixture of air and oil to the other of said fluid coupling units to render said other coupling unit incapable of transmitting torque, said valve means also being effective in said second position to deliver oil from said pump to said auxiliary transmission unit to establish overdrive operation of said auxiliary transmission unit.

14. In combination in a dual engine power train, a power input shaft driven by one engine, a fluid coupling unit for operatively connecting said input shaft to a power delivery shaft, a second power input shaft driven by a second engine, a second fluid coupling unit for operatively connecting said second power input shaft to a second power delivery shaft, torque transfer means operatively connecting said power delivery shafts to each other, a pump driven by one of said power delivery shafts, a source of air under pressure, an auxiliary transmission unit adapted to drive a compressor in direct or overdrive drive ratio, valve means effective in one position to connect both of said fluid couplings to said pump to establish drive therethrough and to connect said auxiliary transmission to said pump for direct drive of said compressor, said valve means being effective in a second position to direct air under pressure to one of said fluid coupling units to render said coupling unit ineffective to transmit torque, said valve means also being effective in said second position to direct fluid pressure from said pump to said auxiliary transmission to establish overdrive operation of said compressor, driver operable control means for selectively positioning said valve means in said first or second position, means for locking said control means in any selected position, and vehicle brake pedal operated release mechanism for releasing said locking means.

15. In combination in a dual engine power train, a power input shaft driven by one engine, a fluid coupling unit for operatively connecting said power input shaft to a power delivery shaft, a second power input shaft driven by a second engine, a second fluid coupling unit for operatively connecting said second power input shaft to a second power delivery shaft, torque transfer means operatively connecting said power delivery shafts to each other, a pump driven by one of said power delivery shafts, an auxiliary transmission unit driven by one of said engines, valve means for controlling drive through said fluid coupling units and the drive ratio of said auxiliary transmission, an engine driven governor, said valve means being effective in one position to deliver fluid under pressure to said auxiliary transmission to establish overdrive operation of said auxiliary transmission, and means responsive to fluid pressure delivered by said valve to establish overdrive operation of said auxiliary transmission for setting said governor to maintain a predetermined engine speed.

16. In combination in a dual engine power train, a power input shaft driven by one engine, a fluid coupling unit for operatively connecting said power input shaft to a power delivery shaft, a second power input shaft driven by a second engine, a second fluid coupling unit for operatively connecting said second power input shaft to a second power delivery shaft, torque transfer means operably connecting said delivery shafts to each other, a fluid pressure source, an auxiliary two-speed transmission unit driven by one of said engines, valve means for controlling drive through said fluid coupling units and the drive ratio of said auxiliary transmission unit, an engine driven governor controlled by an accelerator pedal and normally effective to limit engine speed to a predetermined speed, and means responsive to fluid pressure delivered by said valve means to said auxiliary transmission for setting said governor to maintain a predetermined engine speed irrespective of the position of said accelerator pedal.

17. In combination in a dual engine power train, a power input shaft driven by one engine, a fluid coupling unit for operatively connecting said power input shaft to a power delivery shaft, a second power input shaft driven by a second engine, a second fluid coupling unit for operatively connecting said second power input shaft to a second power delivery shaft, torque transfer means operatively connecting said power delivery shafts to each other, an auxiliary plural speed transmission unit driven by one of said engines, a fluid pressure source, valve means for controlling drive through said fluid coupling units and for controlling the drive ratio of said auxiliary transmission unit, engine driven governors associated with each of said engine, said governors being normally controlled by an accelerator pedal and effective to limit the speed of said engines to a predetermined maximum speed, said valve means being effective in one operative position to direct fluid pressure from said source to said auxiliary transmission to establish overdrive operation of said auxiliary transmission, and fluid pressure responsive means responsive to fluid pressure directed to said auxiliary transmission to establish overdrive operation thereof for setting said governors to maintain a predetermined engine speed of both engines irrespective of the position of said accelerator pedal.

18. In combination in a dual engine power train, a power input shaft driven by one engine, a fluid coupling unit for operatively connecting said power input shaft to a power delivery shaft, a second power input shaft driven by a second engine, a second fluid coupling unit for operatively connecting said second power input shaft to a second power delivery shaft, torque transfer means operatively connecting said power delivery shafts to each other, an auxiliary plural speed transmission unit driven by one of said engines, a fluid pressure, source, a source of air under pressure, valve means for controlling drive through said fluid units and for controlling the drive ratio of said auxiliary transmission unit, engine driven governors associated with each of said engines, said governors being normally controlled by an accelerator pedal and effective to limit the speed of said engines to a predetermined maximum speed, said valve means being effective in one operative position to connect one of said fluid coupling units to said air pressure source and to connect the other of said fluid coupling units to said fluid pressure source, said valve means also being effective in said last-mentioned position to direct fluid pressure to said auxiliary transmission unit to establish overdrive operation of said auxiliary transmission, and governor control means responsive to fluid pressure directed to said auxiliary transmission for establishing overdrive operation of said auxiliary transmission for setting said governors to maintain a predetermined engine speed of both engines irrespective of the position of said accelerator pedal.

19. In combination in a dual engine power train, a power input shaft driven by one engine, a fluid coupling unit for operatively connecting said power input shaft to a power delivery shaft, a second power input shaft driven by a second engine, a second fluid coupling unit for operatively connecting said second power input shaft to a second power delivery shaft, torque transfer means operatively connecting said power delivery shafts to each other, an auxiliary plural speed transmission unit driven by one of said engines, a fluid pressure, source, a source of air under pressure, valve means for controlling drive through said fluid coupling units and for controlling the drive ratio of said auxiliary transmission unit, engine driven governors associated with each of said engines, said governors being normally controlled by an accelerator pedal and effective to limit the speed of said engines to a pre-determined maximum speed, said valve means being effective in one operative position to connect both of said fluid coupling units to said fluid pressure source and to direct fluid pressure from said source to said auxiliary transmission unit to establish direct drive through said auxiliary transmission unit, said valve means being effective in a second operative position to direct air under pressure to one fluid coupling unit and to direct fluid pressure to another of said coupling units, said valve means also being effective in said second position to direct fluid pressure to said auxiliary transmission unit for overdrive operation of said auxiliary transmission unit, and governor control means responsive to fluid pressure directed to said auxiliary transmission unit for establishing overdrive operation for setting said governors to maintain a predetermined engine speed of both engines irrespective of the position of said accelerator pedal.

20. In combination in a dual engine power train, a power input shaft driven by one engine, a fluid coupling unit for operatively connecting said power input shaft to a power delivery shaft, a power input shaft driven by a second engine, a fluid coupling unit for operatively connecting said second power input shaft to a second power delivery shaft, torque transfer means operatively connecting said power delivery shafts to each other, a plural speed auxiliary transmission unit driven by one of said engines, a fluid pressure source, valve means for controlling drive through said fluid coupling units and for controlling the drive ratio of said auxiliary transmission unit, a first passage connecting said auxiliary transmission to said valve means, a second passage connecting said auxiliary transmission to said valve means, a shuttle valve in said passages, said shuttle valve being responsive to fluid pressure delivered to either of said passages by said valve means to block off the other of said passages, and spring means effective to center said shuttle valve to connect said auxiliary transmission to said valve means through both of said passages when both of said passages are connected to exhaust.

21. In combination in a dual engine power train, a power input shaft driven by one engine, a fluid coupling unit for operatively connectnig said power input shaft to a power delivery shaft, a power input shaft driven by a second engine, a fluid coupling unit for operatively connecting said second power input shaft to a second power delivery shaft, torque transfer means for operatively connecting said power delivery shafts to each other, a plural speed auxiliary transmission unit driven by one of said engines, engine driven governors associated with each of said engines, said governors being normally controlled by an accelerator pedal and effective to limit the speed of said engines to a predetermined maximum speed, a fluid pressure source,, valve means for controlling drive through said fluid coupling units and the drive ratio of said auxiliary transmission unit, a first passage controlled by said valve means connecting said valve means to said auxiliary transmission, a second passage controlled by said valve means connecting said valve means to said auxiliary transmission unit, a shuttle valve responsive to fluid pressure in said first passage for blocking off said second passage to prevent admission of pressure to said transmission unit through said second passage, spring means for positioning said shuttle valve to connect said auxiliary transmission to said valve means through said second passage upon exhaust of fluid pressure from said first passage, and governor control means responsive to fluid pressure in said second passage for setting said governors to maintain a predetermined engine speed irrespective of the position of said accelerator pedal.

22. In combination in a dual engine power train, a power input shaft driven by one engine, a fluid coupling unit for operatively connecting said power input shaft to a power delivery shaft, a second power input shaft driven by a second engine, a fluid coupling unit for operatively connecting said second power input shaft to a second power delivery shaft, torque transfer means operatively connecting said power delivery shafts to each other, a plural speed auxiliary transmission unit driven by one of said engines, engine driven governors associated with each of said engines, said governors being normally controlled by an accelerator pedal and effective to limit the speed of said engines to a predetermined maximum engine speed, a fluid pressure source, valve means for controlling drive through said fluid coupling units and the drive ratio of said auxiliary transmission unit, a first passage connecting said auxiliary transmission to said valve means, a second passage connecting said auxiliary transmission to said valve means, a shuttle valve in said passages, said shuttle valve being responsive to fluid pressure delivered to either of said passages by said valve means to block off the other of said passages, spring means for positioning said shuttle valve to open both of said passages when both of said passages are connected to exhaust, and governor control means in one of said passages between said shuttle valve and said auxiliary transmission unit, said governor control means being responsive to fluid pressure delivered to said last-mentioned passage for setting said governors to a predetermined speed setting irrespective of the position of said accelerator pedal.

23. In combination in a dual engine power train, a power input shaft driven by one engine, a fluid coupling unit for operatively connecting said power shaft to a power delivery shaft, a second power input shaft driven by a second engine, a second fluid coupling unit for operatively connecting said second power input shaft to a second power delivery shaft, torque transmitting means connecting said power delivery shafts to each other, an auxiliary plural speed transmission unit driven by one of said engines, a fluid pressure source, a source of air under pressure, valve means for controlling drive through said fluid couplings and for controlling the drive ratio of said auxiliary transmission, a first passage connecting said valve means and said auxiliary transmission, a second passage connecting said valve means and said auxiliary transmission, and timing valves in each of said passages, said timing valves being effective to restrict the rate of admission of fluid pressure to said auxiliary transmission and to permit unrestricted exhaust of fluid pressure from said transmission, said valve means being effective in one position to direct fluid pressure to both of said fluid coupling units and to one of said passages and to connect the other of said passages to exhaust, said valve means being effective in a second position to direct air under pressure to one of said fluid coupling units and to direct fluid under pressure to the other of said fluid coupling units, said valve means also being effective in said second position to connect said one passage to exhaust and to connect said other pressure to said fluid pressure source.

24. In combination in a dual engine power train, a power delivery shaft driven by one engine, a power delivery shaft driven by a second engine, means operatively connecting said power delivery shafts to each other, a two-speed clutch unit driven by one of said power delivery shafts adapted to provide neutral, direct drive or overdrive operation of a third power delivery shaft, a shiftable transmission driven by said third power delivery shaft adapted to be driven in any one of a plurality of drive ratios, control means for selecting the drive ratio of said clutch unit, control means for selecting the drive ratio of said transmission unit, engine driven governors associated with each engine and normally effective to limit the speed of said engines to a predetermined maximum engine speed, and means effective upon selection of a predetermined drive ratio in said clutch unit and in said transmission unit to set said governors to limit the maximum engine speed to a different predetermined engine speed.

25. In combination in a dual engine power train, a power input shaft driven by a first engine, means for operatively connecting said power input shaft to a power delivery shaft, a second power input shaft driven by a second engine, means operatively connecting said second power input shaft to a second power delivery shaft, means operatively connecting said power delivery shafts to each other, a two-speed clutch unit driven by one of said power delivery shafts for driving a third power delivery shaft, a shiftable transmission unit driven by said third power delivery shaft, clutch pedal controlled means for establishing neutral or drive through said two-speed clutch unit, control means for selecting the drive ratio of said two-speed clutch unit, control means for selecting the drive ratio of said transmission unit, engine driven governors associated with each of said engines normally effective to limit the speed of said engines to a predetermined maximum engine speed and means effective upon selection of a predetermined drive ratio in said two-speed clutch unit and said transmission unit to set said governors to limit the maximum engine speed to a different predetermined engine speed.

26. In combination in a dual engine power train, a power input shaft driven by a first engine, a fluid coupling unit for operatively connecting said power input shaft to a power delivery shaft, a second power input shaft driven by a second engine, a fluid coupling unit for operatively connecting said second power input shaft to a second power delivery shaft, torque transfer means operatively connecting said power delivery shafts to each other, a two-speed clutch unit driven by one of said power delivery shafts for driving a third power delivery shaft, a shiftable transmission unit driven by said third power delivery shaft, clutch pedal controlled means for establishing neutral or drive through said two-speed clutch unit, valve means for selecting the drive ratio in said two-speed clutch unit, means for controlling the drive ratio of said transmission unit, engine driven governors normally operative to limit the speed of said engines to a predetermined maximum engine speed, means for controlling said valve means to select the drive ratio of said two-speed clutch unit, said last-mentioned means and said transmission drive ratio control means being effective upon selection of a predetermined drive ratio in said two-speed clutch unit and a predetermined drive ratio in said transmission unit to set said governors to limit the maximum engine speed to a different predetermined engine speed.

27. In combination in a dual engine power train, a power delivery shaft driven by one engine, a power delivery shaft driven by a second engine, means operatively connecting said power delivery shafts to each other, a two-speed clutch unit adapted to provide neutral, direct drive or overdrive operation of a third power delivery shaft, a shiftable transmission driven by said third power delivery shaft adapted to be driven in any one of a plurality of drive ratios, governors driven by each of said engines normally effective to limit the speed of said engines to a predetermined maximum engine speed, a solenoid valve for controlling the drive ratio of said two-speed clutch unit, a switch for controlling said solenoid valve, control means for selecting the drive ratio of said transmission unit, a switch controlled by said control means, and electrically controlled governor control means controlled by both of said switches, said switches being effective upon selection of overdrive in said clutch unit and predetermined drive ratio in said transmission unit to set said governors to limit the permissible engine speed to a different predetermined maximum engine speed.

28. In combination in a dual engine power train, a power shaft driven by one engine, a power shaft driven by a second engine, torque transfer means operatively connecting said power shafts to each other, a two-speed clutch unit adapted to selectively provide neutral, direct drive or overdrive operation of a third power shaft, a shiftable transmission driven by said third power shaft adapted to be driven in any one of a plurality of drive ratios including direct drive, governors driven by each of said engines normally effective to limit the speed of said engines to a predetermined maximum engine speed, a solenoid valve for controlling the drive ratio of said two-speed clutch unit, clutch pedal actuated control mechanism for establishing neutral drive condition in said two-speed clutch unit, a switch for controlling said solenoid valve, control mechanism for selecting the drive ratio of said transmission unit, a switch controlled by said control mechanism, and electrically controlled governor control means controlled by said switches, said switches being effective upon selection of overdrive in said clutch unit and direct drive in said transmission unit to set said governors to limit the permissible maximum engine speed to a lower maximum speed than that permitted in all other drive ratios.

29. In combination in a power train, an engine, a plural speed transmission unit drivingly connected to said engine, said transmission unit including a fluid coupling, a two-speed clutch mechanism, and an auxiliary change-speed transmission gear mechanism, speed control means for said clutch mechanism, drive ratio controlling means for said auxiliary transmission mechanism, fuel control means for said engine controlling the speed and torque thereof and including an engine driven governor normally effective to limit the speed of said engine to a predetermined maximum, and means effective in one cooperative position of said clutch control means and said drive ratio controlling means to set said governor to limit the engine to a different predetermined maximum engine speed.

30. A control mechanism for a power train having an engine, a plural speed transmission unit drivingly connected to said engine, said transmission unit including a fluid coupling, a change-speed gear mechanism, and a clutch mechanism operable to drivingly interconnect said fluid coupling and said gear mechanism, said clutch mechanism and said gear mechanism being operable to establish overdrive operation of said transmission unit, said control mechanism including, in combination, a drive ratio controlling means for said gear mechanism, control means for controlling drive through said clutch mechanism, said means being effective in one cooperative position to establish overdrive operation of said transmission unit, an engine driven governor normally effective to limit the speed of said engine to a predetermined maximum speed, and governor control means responsive to the overdrive operation of said transmission unit for setting said governor to limit the engine speed to a different predetermined engine speed.

31. In a power train including an engine, a fluid coupling unit operatively connected to said engine, a clutch mechanism, an auxiliary plural speed transmission unit driving connectable to said coupling through said clutch mechanism, an engine fuel control linkage, an engine driven governor having a modulating connectio with said linkage and normally being effective to limit the speed of said engine to a predetermined maximum speed, a first means for controlling drive through said clutch mechanism, a second means for establishing the drive ratio of said transmission unit, and governor control means responsive to the operating positions of said first and second means and effective in one operating position of said first and second means to set said governor to limit the engine to a different predetermined engine speed irrespective of the position of said fuel control linkage.

References Cited in the file of this patent
UNITED STATES PATENTS

| | | |
|---|---|---|
| 2,348,763 | Syrouy et al. | May 16, 1944 |
| 2,422,173 | Wilson | June 10, 1947 |
| 2,576,478 | Beckwith | Nov. 27, 1951 |
| 2,632,544 | Hockert | Mar. 24, 1953 |
| 2,636,585 | Livermore | Apr. 28, 1953 |
| 2,771,788 | Frick et al. | Nov. 27, 1956 |